United States Patent
Matsui

(10) Patent No.: US 8,041,911 B2
(45) Date of Patent: Oct. 18, 2011

(54) REMOTE COPY SYSTEM AND METHOD OF DECIDING RECOVERY POINT OBJECTIVE IN REMOTE COPY SYSTEM

(75) Inventor: Yoshinori Matsui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 618 days.

(21) Appl. No.: 12/132,266

(22) Filed: Jun. 3, 2008

(65) Prior Publication Data

US 2009/0204774 A1 Aug. 13, 2009

(30) Foreign Application Priority Data

Feb. 13, 2008 (JP) ................................ 2008-031540

(51) Int. Cl.
*G06F 13/00* (2006.01)

(52) U.S. Cl. ...................................................... 711/162
(58) Field of Classification Search .................. None
See application file for complete search history.

(56) References Cited

U.S. PATENT DOCUMENTS

| | | | |
|---|---|---|---|
| 2005/0055523 A1* | 3/2005 | Suishu et al. | 711/165 |
| 2006/0010300 A1* | 1/2006 | Arakawa et al. | 711/162 |
| 2007/0168361 A1 | 7/2007 | Hirakawa et al. | |

FOREIGN PATENT DOCUMENTS

JP 2005-18506 1/2005

* cited by examiner

*Primary Examiner* — Duc Doan
(74) *Attorney, Agent, or Firm* — Antonelli, Terry, Stout & Kraus, LLP.

(57) ABSTRACT

A remote copy system comprises a primary storage system having a primary volume, and a secondary storage system having a secondary volume forming a pair relationship with the primary volume. When the primary storage system receives a write command from a primary host computer, it stores the command in the primary volume and creates a journal added with time information. The secondary storage system receives the journal from the primary storage system and updates the secondary volume based on the received journal. The primary host computer determines, based on the operating status of the secondary storage system, either the time added to the latest journal that the secondary storage system received or the time added to the latest journal that updated the secondary volume as the recovery point objective, and provides the determined time this to the user.

5 Claims, 42 Drawing Sheets

FIG. 5

COPY GROUP DEFINITION TABLE 305

| COPY GROUP ID 500 | PRIMARY COPY ID 501 | SECONDARY COPY ID 502 | PRIMARY VOLUME ADDRESS 503 | SECONDARY VOLUME ADDRESS 504 |
|---|---|---|---|---|
| | | | ⋮ | |
| ⋮ | | | | |

FIG. 8

COPY GROUP MANAGEMENT TABLE 308

| 800 | 801 | 802 | 803 | 804 | 805 | 806 |
|---|---|---|---|---|---|---|
| COPY GROUP ID | PRIMARY COPY ID | SECONDARY COPY ID | PRIMARY VOLUME ADDRESS | SECONDARY VOLUME ADDRESS | PAIR STATUS | CONSISTENCY TIME |
| | | | ⋮ | | | |
| | | | ⋮ | | | |

JOURNAL MANAGEMENT TABLE 1100

FIG. 12

COPY MANAGEMENT TABLE 923

| PRIMARY COPY ID (1200) | SECONDARY COPY ID (1201) | PRIMARY VOLUME ADDRESS (1202) | SECONDARY VOLUME ADDRESS (1203) | PAIR STATUS (1204) | RESTORATION FINISH TIME (1205) | VALID FLAG (1206) |
|---|---|---|---|---|---|---|
| | | | | ⋮ | | |
| | | | | ⋮ | | |

FIG. 13

JOURNAL VOLUME MANAGEMENT TABLE 924

| COPY ID | VOLUME ADDRESS | VOLUME STATUS | JOURNAL RECEPTION TIME | VALID FLAG |
|---|---|---|---|---|
| | ⋮ | | | |
| | ⋮ | | | |

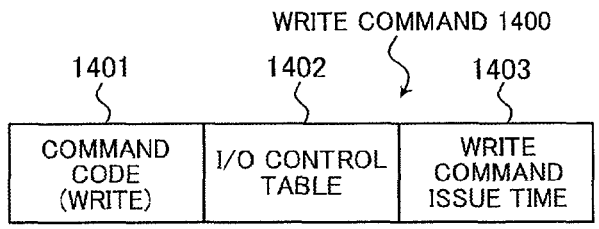

WRITE COMMAND 1400

| 1401 | 1402 | 1403 |
|---|---|---|
| COMMAND CODE (WRITE) | I/O CONTROL TABLE | WRITE COMMAND ISSUE TIME |

FIG. 14B

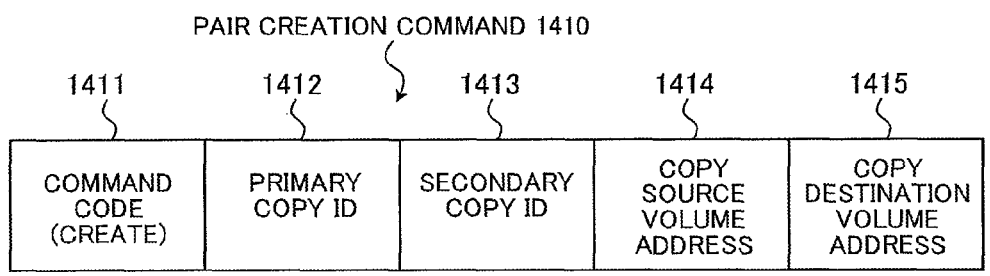

PAIR CREATION COMMAND 1410

| 1411 | 1412 | 1413 | 1414 | 1415 |
|---|---|---|---|---|
| COMMAND CODE (CREATE) | PRIMARY COPY ID | SECONDARY COPY ID | COPY SOURCE VOLUME ADDRESS | COPY DESTINATION VOLUME ADDRESS |

FIG. 14C

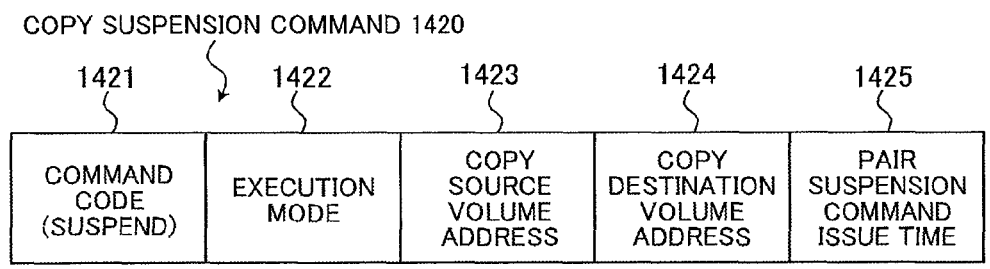

COPY SUSPENSION COMMAND 1420

| 1421 | 1422 | 1423 | 1424 | 1425 |
|---|---|---|---|---|
| COMMAND CODE (SUSPEND) | EXECUTION MODE | COPY SOURCE VOLUME ADDRESS | COPY DESTINATION VOLUME ADDRESS | PAIR SUSPENSION COMMAND ISSUE TIME |

FIG. 14D

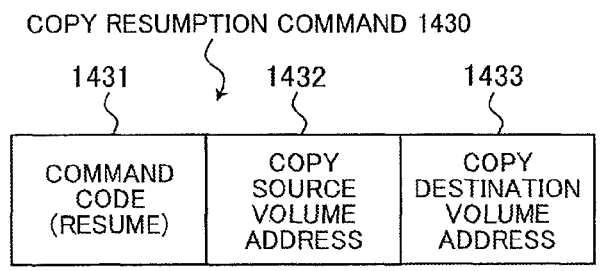

COPY RESUMPTION COMMAND 1430

| 1431 | 1432 | 1433 |
|---|---|---|
| COMMAND CODE (RESUME) | COPY SOURCE VOLUME ADDRESS | COPY DESTINATION VOLUME ADDRESS |

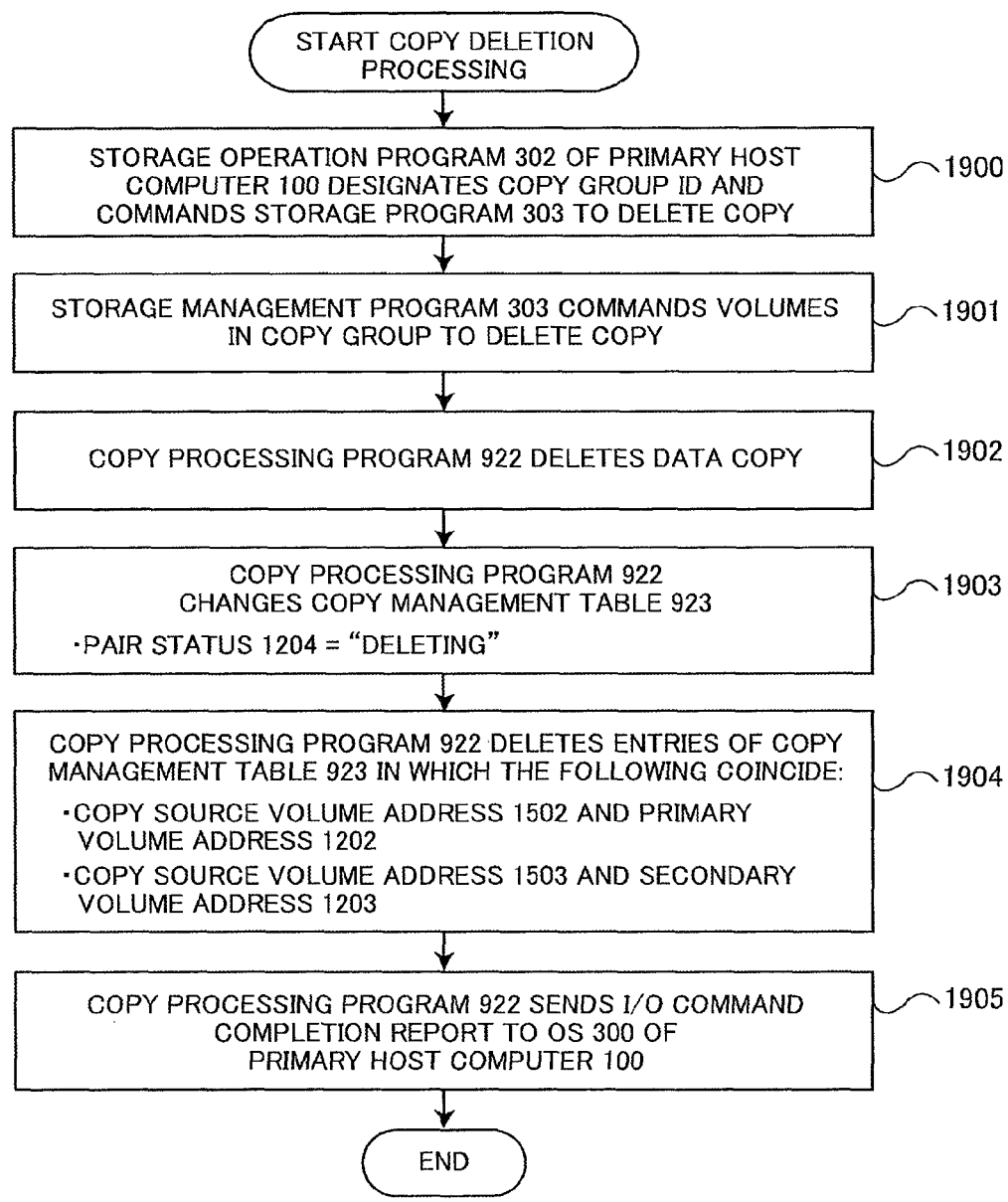

FIG. 23

PAIR STATUS TABLE 1520'

| 1521 | 1522 | 1523 | 1524 | 1525 | 1527 | 1528 | 1529 | 1530 |
|---|---|---|---|---|---|---|---|---|
| COPY SOURCE VOLUME ADDRESS | COPY DESTINATION VOLUME ADDRESS | PRIMARY COPY ID | SECONDARY COPY ID | PAIR STATUS | CONSISTENCY TIME D | VALID FLAG D | CONSISTENCY TIME J | VALID FLAG J |

FIG. 31A

COPY GROUP DEFINITION TABLE 305

| COPY GROUP ID | PRIMARY COPY ID | SECONDARY COPY ID | PRIMARY VOLUME ADDRESS | SECONDARY VOLUME ADDRESS |
|---|---|---|---|---|
| GRP01 | 01 | 02 | P00 | S00 |
| | | | P01 | S01 |
| | | | P02 | S01 |

JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | NORMAL | — | INVALID |
| | Y01 | NORMAL | — | INVALID |

| TIME | OPERATION | | | | 3200 |
|---|---|---|---|---|---|
| 10:00 | ACQUIRE PAIR STATUS | | | | |
| 10:05 | CREATE PAIR | | | | |
| 10:30 | ACQUIRE PAIR STATUS | | | | |
| 10:35 | INTERMITTENTLY ISSUE WRITE COMMAND TO PRIMARY VOLUME | | | | |
| 12:30 | ACQUIRE PAIR STATUS | | | | |
| 12:40 | SUSPEND COPY EXECUTION MODE = FLASH | SUSPEND COPY EXECUTION MODE = PURGE | FAILURE OCCURRED IN PRIMARY VOLUME | FAILURE OCCURRED IN SECONDARY JOURNAL VOLUME | |
| 12:50 | ACQUIRE PAIR STATUS | | | | |
| 13:00 | DELETE PAIR | | | | |
| 13:30 | ACQUIRE PAIR STATUS | | | | |

FIG. 33A

COPY MANAGEMENT TABLE 923

| PRIMARY COPY ID (1200) | SECONDARY COPY ID (1201) | PRIMARY VOLUME ADDRESS (1202) | SECONDARY VOLUME ADDRESS (1203) | PAIR STATUS (1204) | RESTORATION FINISH TIME (1205) | VALID FLAG (1206) |
|---|---|---|---|---|---|---|
| — | — | — | — | — | — | — |

FIG. 33B

JOURNAL VOLUME MANAGEMENT TABLE (PRIMARY STORAGE SYSTEM) 924a

| COPY ID (1300a) | VOLUME ADDRESS (1301a) | VOLUME STATUS (1302a) | JOURNAL RECEPTION TIME (1303a) | VALID FLAG (1304a) |
|---|---|---|---|---|
| 01 | X00 | NORMAL | — | INVALID |
|  | X01 | NORMAL | — | INVALID |

FIG. 33C

JOURNAL VOLUME MANAGEMENT TABLE (SECONDARY STORAGE SYSTEM) 924b

| COPY ID (1300b) | VOLUME ADDRESS (1301b) | VOLUME STATUS (1302b) | JOURNAL RECEPTION TIME (1303b) | VALID FLAG (1304b) |
|---|---|---|---|---|
| 02 | Y00 | NORMAL | — | INVALID |
|  | Y01 | NORMAL | — | INVALID |

FIG. 33D

PAIR STATUS TABLE 1520

| COPY SOURCE VOLUME ADDRESS (1521) | COPY DESTINATION VOLUME ADDRESS (1522) | PRIMARY COPY ID (1523) | SECONDARY COPY ID (1524) | PAIR STATUS (1525) | CONSISTENCY TIME (1526) |
|---|---|---|---|---|---|
| P00 | — | — | — | Simplex | — |

FIG. 34A

COPY MANAGEMENT TABLE 923

| PRIMARY COPY ID | SECONDARY COPY ID | PRIMARY VOLUME ADDRESS | SECONDARY VOLUME ADDRESS | PAIR STATUS | RESTORATION FINISH TIME | VALID FLAG |
|---|---|---|---|---|---|---|
| 01 | 02 | P00 | S00 | Duplex | — | INVALID |
| | | P01 | S01 | Duplex | — | INVALID |
| | | P02 | S02 | Duplex | — | INVALID |

FIG. 34B

JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

FIG. 34C

JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | NORMAL | — | INVALID |
| | Y01 | NORMAL | — | INVALID |

FIG. 34D

PAIR STATUS TABLE 1520

| COPY SOURCE VOLUME ADDRESS | COPY DESTINATION VOLUME ADDRESS | PRIMARY COPY ID | SECONDARY COPY ID | PAIR STATUS | CONSISTENCY TIME |
|---|---|---|---|---|---|
| P00 | S00 | 01 | 02 | Duplex | — |

FIG. 35A
COPY MANAGEMENT TABLE 923

| PRIMARY COPY ID | SECONDARY COPY ID | PRIMARY VOLUME ADDRESS | SECONDARY VOLUME ADDRESS | PAIR STATUS | RESTORATION FINISH TIME | VALID FLAG |
|---|---|---|---|---|---|---|
| 01 | 02 | P00 | S00 | Duplex | 11:50 | VALID |
| | | P01 | S01 | Duplex | 11:52 | VALID |
| | | P02 | S02 | Duplex | 11:54 | VALID |

FIG. 35B
JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

FIG. 35C
JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | NORMAL | 12:22 | VALID |
| | Y01 | NORMAL | 12:24 | VALID |

FIG. 35D
PAIR STATUS TABLE 1520

| COPY SOURCE VOLUME ADDRESS | COPY DESTINATION VOLUME ADDRESS | PRIMARY COPY ID | SECONDARY COPY ID | PAIR STATUS | CONSISTENCY TIME |
|---|---|---|---|---|---|
| P00 | S00 | 01 | 02 | Duplex | 12:24 |

FIG. 36A

COPY MANAGEMENT TABLE 923

| PRIMARY COPY ID | SECONDARY COPY ID | PRIMARY VOLUME ADDRESS | SECONDARY VOLUME ADDRESS | PAIR STATUS | RESTORATION FINISH TIME | VALID FLAG |
|---|---|---|---|---|---|---|
| 01 | 02 | P00 | S00 | Suspend-Operation | 12:40 | VALID |
| | | P01 | S01 | Suspend-Operation | 12:40 | VALID |
| | | P02 | S02 | Suspend-Operation | 12:40 | VALID |

FIG. 36B

JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

FIG. 36C

JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | NORMAL | 12:40 | VALID |
| | Y01 | NORMAL | 12:40 | VALID |

FIG. 36D

PAIR STATUS TABLE 1520

| COPY SOURCE VOLUME ADDRESS | COPY DESTINATION VOLUME ADDRESS | PRIMARY COPY ID | SECONDARY COPY ID | PAIR STATUS | CONSISTENCY TIME |
|---|---|---|---|---|---|
| P00 | S00 | 01 | 02 | Suspend-Operation | 12:40 |

FIG. 37A

COPY MANAGEMENT TABLE 923

| PRIMARY COPY ID (1200) | SECONDARY COPY ID (1201) | PRIMARY VOLUME ADDRESS (1202) | SECONDARY VOLUME ADDRESS (1203) | PAIR STATUS (1204) | RESTORATION FINISH TIME (1205) | VALID FLAG (1206) |
|---|---|---|---|---|---|---|
| 01 | 02 | P00 | S00 | Suspend—Operation | 12:31 | VALID |
|  |  | P01 | S01 | Suspend—Operation | 12:32 | VALID |
|  |  | P02 | S02 | Suspend—Operation | 12:33 | VALID |

FIG. 37B

JOURNAL VOLUME MANAGEMENT TABLE (PRIMARY STORAGE SYSTEM) 924a

| COPY ID (1300a) | VOLUME ADDRESS (1301a) | VOLUME STATUS (1302a) | JOURNAL RECEPTION TIME (1303a) | VALID FLAG (1304a) |
|---|---|---|---|---|
| 01 | X00 | NORMAL | — | INVALID |
|  | X01 | NORMAL | — | INVALID |

FIG. 37C

JOURNAL VOLUME MANAGEMENT TABLE (SECONDARY STORAGE SYSTEM) 924b

| COPY ID (1300b) | VOLUME ADDRESS (1301b) | VOLUME STATUS (1302b) | JOURNAL RECEPTION TIME (1303b) | VALID FLAG (1304b) |
|---|---|---|---|---|
| 02 | Y00 | NORMAL | — | INVALID |
|  | Y01 | NORMAL | — | INVALID |

FIG. 37D

PAIR STATUS TABLE 1520

| COPY SOURCE VOLUME ADDRESS (1521) | COPY DESTINATION VOLUME ADDRESS (1522) | PRIMARY COPY ID (1523) | SECONDARY COPY ID (1524) | PAIR STATUS (1525) | CONSISTENCY TIME (1526) |
|---|---|---|---|---|---|
| P00 | S00 | — | — | Suspend—Operation | 12:33 |

FIG. 38A
COPY MANAGEMENT TABLE 923

| PRIMARY COPY ID | SECONDARY COPY ID | PRIMARY VOLUME ADDRESS | SECONDARY VOLUME ADDRESS | PAIR STATUS | RESTORATION FINISH TIME | VALID FLAG |
|---|---|---|---|---|---|---|
| 01 | 02 | P00 | S00 | Suspend-Failure | 12:31 | VALID |
| | | P01 | S01 | Suspend-Failure | 12:32 | VALID |
| | | P02 | S02 | Suspend-Failure | 12:33 | VALID |

FIG. 38B
JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

FIG. 38C
JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | NORMAL | 12:38 | VALID |
| | Y01 | NORMAL | 12:36 | VALID |

FIG. 38D
PAIR STATUS TABLE 1520

| COPY SOURCE VOLUME ADDRESS | COPY DESTINATION VOLUME ADDRESS | PRIMARY COPY ID | SECONDARY COPY ID | PAIR STATUS | CONSISTENCY TIME |
|---|---|---|---|---|---|
| P00 | S00 | 01 | 02 | Suspend-Failure | 12:38 |

FIG. 39A

COPY MANAGEMENT TABLE 923

| PRIMARY COPY ID | SECONDARY COPY ID | PRIMARY VOLUME ADDRESS | SECONDARY VOLUME ADDRESS | PAIR STATUS | RESTORATION FINISH TIME | VALID FLAG |
|---|---|---|---|---|---|---|
| 01 | 02 | P00 | S00 | Suspend-Failure | 12:31 | VALID |
| | | P01 | S01 | Suspend-Failure | 12:32 | VALID |
| | | P02 | S02 | Suspend-Failure | 12:33 | VALID |

FIG. 39B

JOURNAL VOLUME MANAGEMENT TABLE (PRIMARY STORAGE SYSTEM) 924a

| COPY ID | VOLUME ADDRESS | VOLUME STATUS | JOURNAL RECEPTION TIME | VALID FLAG |
|---|---|---|---|---|
| 01 | X00 | NORMAL | — | INVALID |
| | X01 | NORMAL | — | INVALID |

FIG. 39C

JOURNAL VOLUME MANAGEMENT TABLE (SECONDARY STORAGE SYSTEM) 924b

| COPY ID | VOLUME ADDRESS | VOLUME STATUS | JOURNAL RECEPTION TIME | VALID FLAG |
|---|---|---|---|---|
| 02 | Y00 | FAILURE | — | INVALID |
| | Y01 | FAILURE | — | INVALID |

FIG. 39D

PAIR STATUS TABLE 1520

| COPY SOURCE VOLUME ADDRESS | COPY DESTINATION VOLUME ADDRESS | PRIMARY COPY ID | SECONDARY COPY ID | PAIR STATUS | CONSISTENCY TIME |
|---|---|---|---|---|---|
| P00 | S00 | — | — | Suspend-Failure | 12:33 |

FIG. 40A

COPY MANAGEMENT TABLE 923

| PRIMARY COPY ID (1200) | SECONDARY COPY ID (1201) | PRIMARY VOLUME ADDRESS (1202) | SECONDARY VOLUME ADDRESS (1203) | PAIR STATUS (1204) | RESTORATION FINISH TIME (1205) | VALID FLAG (1206) |
|---|---|---|---|---|---|---|
| — | — | — | — | — | — | — |

FIG. 40B

JOURNAL VOLUME MANAGEMENT TABLE (PRIMARY STORAGE SYSTEM) 924a

| COPY ID (1300a) | VOLUME ADDRESS (1301a) | VOLUME STATUS (1302a) | JOURNAL RECEPTION TIME (1303a) | VALID FLAG (1304a) |
|---|---|---|---|---|
| 01 | X00 | NORMAL | — | INVALID |
| | X01 | NORMAL | — | INVALID |

FIG. 40C

JOURNAL VOLUME MANAGEMENT TABLE (SECONDARY STORAGE SYSTEM) 924b

| COPY ID (1300b) | VOLUME ADDRESS (1301b) | VOLUME STATUS (1302b) | JOURNAL RECEPTION TIME (1303b) | VALID FLAG (1304b) |
|---|---|---|---|---|
| 02 | Y00 | NORMAL | — | INVALID |
| | Y01 | NORMAL | — | INVALID |

FIG. 40D

PAIR STATUS TABLE 1520

| COPY SOURCE VOLUME ADDRESS (1521) | COPY DESTINATION VOLUME ADDRESS (1522) | PRIMARY COPY ID (1523) | SECONDARY COPY ID (1524) | PAIR STATUS (1525) | CONSISTENCY TIME (1526) |
|---|---|---|---|---|---|
| P00 | — | — | — | Simplex | — |

REMOTE COPY SYSTEM AND METHOD OF DECIDING RECOVERY POINT OBJECTIVE IN REMOTE COPY SYSTEM

CROSS-REFERENCES

This application relates to and claims priority from Japanese Patent Application No. 2008-031540, filed on Feb. 13, 2008, the entire disclosure of which is incorporated herein by reference.

BACKGROUND

The present invention generally relates to a remote copy system, and particularly relates to a remote copy system that copies data between storage systems located respectively at two remote sites.

In recent years, the importance of corporate information systems and the data used therein is increasing, and disaster recovery technology for recovering data in computer systems that failed due to a disaster or the like is attracting attention. A remote copy system is known as representative technology for performing disaster recovery.

For instance, Japanese Patent Laid-Open Publication No. 2005-18506 (Patent Document 1) discloses technology where a storage system receives data sent from a host computer and writes the data in its own storage apparatus, and also transfers such data to another storage system positioned in a physically remote location in order to store the data.

More specifically, this technology relates to a computer system having a primary host computer and a primary storage system connected thereto at a primary site, and a secondary host computer and a secondary storage system connected thereto at a secondary site that is located remotely from the primary site. When the primary storage system receives data with a creation timestamp from the primary host computer, it writes the data in its own volume, and further writes the data and its timestamp as a journal in its own journal volume. The secondary storage system reads the journal in the primary storage system, and temporarily stores the data with the timestamp in a journal volume of the secondary storage system in the same update sequence as the volumes of the primary storage system. The secondary storage system then retrieves the data from the journal volume and writes it into the volume. With this computer system, if a failure occurs in the primary site or in a communication line between the primary storage system and the secondary storage system, the journals stored in the journal volume that the secondary storage system received before the failure are reflected in the copy destination volume of the secondary storage system. As a result of adopting this kind of configuration, even if an active computer system encounters a disaster and is subject to a system failure, the data copied to a storage system positioned at a physically remote location can be used to recover the computer system in a relatively short period of time.

With the technology described in Patent Document 1, the time pertaining to the journal that was last reflected in the secondary volume is set as the recovery point objective (RPO). The set recovery point objective is presented to the user of a computer system at the time of recovery, but there is a problem in that such time cannot necessarily be used as a valid recovery point objective.

More specifically, journals that have not yet been reflected in the secondary volume among the journals that the secondary storage system received can be reflected in the secondary volume while maintaining the same update sequence as the primary volume even after a failure occurs in the primary site or in the communication line between the primary site and the secondary site. Thus, although the time pertaining to the journal that was last reflected in the secondary volume immediately before the occurrence of a failure should be set as the recovery point objective under normal circumstances, there are cases where the journals that have already been received by the secondary storage system are subsequently reflected in the secondary volume, and the time pertaining to the journal that was reflected after the occurrence of a failure is set as the recovery point objective.

Further, if the latest time among the time pertaining to the journals that the secondary storage system received is deemed to be the recovery point objective, there are cases where such time is invalidated due to a failure occurring in the secondary journal volume or the remote copy being temporarily suspended.

Such an inaccurate recovery point objective will cause the loss of data, and it may not be possible to recover the computer system to its complete original conditions.

In addition, the user of a computer system must constantly determine whether the presented recovery point objective is valid or invalid, and was excessively burdened with recovery operations.

SUMMARY

In light of the foregoing problems, an object of the present invention is to provide a remote copy system capable of presenting a more accurate recovery point objective to the user of a computer system.

In order to achieve the foregoing object, according to one aspect of the present invention, provided is a remote copy system comprising a first host computer, a first storage system operatively connected to the first host computer and including a first volume, a second host computer, and a second storage system operatively connected to the second host computer and the first storage system, and including a second volume forming a pair relationship with the first volume. When the first storage system receives a write command from the first host computer, the first storage system stores data accompanied with the write command in the first volume, and creates journal data to which time information is added based on the write command. The second storage system receives the created journal data from the first storage system, and updates the second volume based on the received journal data. The first host computer acquires, based on the operating status of the second storage system, either latest time information among the time information added to the journal that the second storage system received or latest time information among the time information added to the journal data that updated the second volume.

According to the present invention, a valid recovery point objective can be obtained according to the operating status of the storage system, and it is thereby possible to realize an accurate recovery. In addition, the user of a computer system is not required to decide a valid recovery point objective by giving consideration to the operating status of the storage system, and it is thereby possible to alleviate the user's burden during the recovery operation.

DESCRIPTION OF DRAWINGS

FIG. 5 is a diagram showing an exemplary copy group definition table retained in a host computer of a remote copy system according to an embodiment of the present invention;

FIG. 8 is a diagram showing an exemplary copy group management table retained in a host computer of a remote copy system according to an embodiment of the present invention;

FIG. 12 is a diagram showing a copy management table retained in a storage system of a remote copy system according to an embodiment of the present invention;

FIG. 13 is a diagram showing a journal volume management table retained in a storage system of a remote copy system according to an embodiment of the present invention;

FIG. 14A is a diagram showing an example of an I/O command format to be used in a remote copy system according to an embodiment of the present invention;

FIG. 14B is a diagram showing an example of an I/O command format to be used in a remote copy system according to an embodiment of the present invention;

FIG. 14C is a diagram showing an example of an I/O command format to be used in a remote copy system according to an embodiment of the present invention;

FIG. 14D is a diagram showing an example of an I/O command format to be used in a remote copy system according to an embodiment of the present invention;

FIG. 19 is a flowchart explaining copy deletion processing in a remote copy system according to an embodiment of the present invention;

FIG. 23 is a diagram showing an example of a pair status table in a remote copy system according to an embodiment of the present invention;

FIG. 31A is a diagram showing an example of a copy group definition table of a host computer in the remote copy system according to an embodiment of the present invention;

FIG. 31B is a diagram showing an example of a journal volume management table of a primary storage system in a remote copy system according to an embodiment of the present invention;

FIG. 31C is a diagram showing an example of a journal volume management table of a secondary storage system in a remote copy system according to an embodiment of the present invention;

FIG. 32 is a diagram showing in a time series an example of operation performed to a copy group set in a remote copy system according to an embodiment of the present invention;

FIG. 33A is a diagram showing contents of a copy management table at the point in time when pair status acquisition processing is executed at a certain time in a remote copy system according to an embodiment of the present invention;

FIG. 33B is a diagram showing contents of a journal volume management table of a primary storage system at the point in time when pair status acquisition processing is executed at a certain time in the remote copy system according to an embodiment of the present invention;

FIG. 33C is a diagram showing contents of a journal volume management table of a secondary storage system at the point in time when pair status acquisition processing is executed at a certain time in a remote copy system according to an embodiment of the present invention;

FIG. 33D is a diagram showing contents of a pair status table at the point in time when pair status acquisition processing is executed at a certain time in a remote copy system according to an embodiment of the present invention;

FIG. 34A is a diagram showing contents of a copy management table at the point in time when pair status acquisition processing is executed at a certain time in a remote copy system according to an embodiment of the present invention;

FIG. 34B is a diagram showing contents of a journal volume management table of a primary storage system at the point in time when pair status acquisition processing is executed at a certain time in a remote copy system according to an embodiment of the present invention;

FIG. 34C is a diagram showing contents of a journal volume management table of a secondary storage system at the point in time when pair status acquisition processing is executed at a certain time in the remote copy system according to an embodiment of the present invention;

FIG. 34D is a diagram showing contents of a pair status table at the point in time when pair status acquisition processing is executed at a certain time in a remote copy system according to an embodiment of the present invention;

FIG. 35A is a diagram showing contents of a copy management table at the point in time when pair status acquisition processing is executed at a certain time in a remote copy system according to an embodiment of the present invention;

FIG. 35B is a diagram showing contents of a journal volume management table of a primary storage system at the point in time when pair status acquisition processing is executed at a certain time in a remote copy system according to an embodiment of the present invention;

FIG. 35C is a diagram showing contents of a journal volume management table of a secondary storage system at the point in time when pair status acquisition processing is executed at a certain time in a remote copy system according to an embodiment of the present invention;

FIG. 35D is a diagram showing contents of a pair status table at the point in time when pair status acquisition processing is executed at a certain time in a remote copy system according to an embodiment of the present invention;

FIG. 36A is a diagram showing contents of a copy management table at the point in time when the pair status acquisition processing is executed at a certain time after copy suspension processing is performed in the remote copy system according to an embodiment of the present invention;

FIG. 36B is a diagram showing contents of a journal volume management table of the primary storage system at the point in time when pair status acquisition processing is executed at a certain time after copy suspension processing is performed in a remote copy system according to an embodiment of the present invention;

FIG. 36C is a diagram showing contents of a journal volume management table of a secondary storage system at the point in time when pair status acquisition processing is executed at a certain time after copy suspension processing is performed in a remote copy system according to an embodiment of the present invention;

FIG. 36D is a diagram showing contents of a pair status table at the point in time when pair status acquisition processing is executed at a certain time after copy suspension processing is performed in a remote copy system according to an embodiment of the present invention;

FIG. 37A is a diagram respectively showing contents of a copy management table at the point in time when pair status acquisition processing is executed at a certain time after copy suspension processing is performed in a remote copy system according to an embodiment of the present invention;

FIG. 37B is a diagram showing contents of a journal volume management table of a primary storage system at the point in time when pair status acquisition processing is executed at a certain time after copy suspension processing is performed in a remote copy system according to an embodiment of the present invention;

FIG. 37C is a diagram showing contents of a journal volume management table of a secondary storage system at the point in time when pair status acquisition processing is executed at a certain time after copy suspension processing is performed in a remote copy system according to an embodiment of the present invention;

FIG. 37D is a diagram showing contents of a pair status table at the point in time when pair status acquisition processing is executed at a certain time after copy suspension processing is performed in a remote copy system according to an embodiment of the present invention;

FIG. 38A is a diagram showing contents of a copy management table when a failure occurs in a primary volume at a certain time in a remote copy system according to an embodiment of the present invention;

FIG. 38B is a diagram showing contents of a journal volume management table of a primary storage system when a failure occurs in tahe primary volume at a certain time in a remote copy system according to an embodiment of the present invention;

FIG. 38C is a diagram showing contents of a journal volume management table of a secondary storage system when a failure occurs in a primary volume at a certain time in a remote copy system according to an embodiment of the present invention;

FIG. 38D is a diagram showing contents of a pair status table when a failure occurs in a primary volume at a certain time in the remote copy system according to an embodiment of the present invention;

FIG. 39A is a diagram showing contents of a copy management table when a failure occurs in a secondary volume at a certain time in a remote copy system according to an embodiment of the present invention;

FIG. 39B is a diagram showing contents of a journal volume management table of a primary storage system when a failure occurs in a secondary volume at a certain time in a remote copy system according to an embodiment of the present invention;

FIG. 39C is a diagram showing contents of a journal volume management table of a secondary storage system when a failure occurs in a secondary volume at a certain time in a remote copy system according to an embodiment of the present invention;

FIG. 39D is a diagram showing contents of a pair status table when a failure occurs in a secondary volume at a certain time in a remote copy system according to an embodiment of the present invention;

FIG. 40A is a diagram respectively showing contents of a copy management table at the point in time when pair status acquisition processing is executed at a certain time after pair deletion processing is performed in a remote copy system according to an embodiment of the present invention;

FIG. 40B is a diagram showing contents of a journal volume management table of the primary storage system at the point in time when pair status acquisition processing is executed at a certain time after pair deletion processing is performed in a remote copy system according to an embodiment of the present invention;

FIG. 40C is a diagram showing contents of a journal volume management table of a secondary storage system at the point in time when pair status acquisition processing is executed at a certain time after pair deletion processing is performed in a remote copy system according to an embodiment of the present invention; and FIG. 40D is a diagram showing contents of a pair status table at the point in time when pair status acquisition processing is executed at a certain time after pair deletion processing is performed in a remote copy system according to an embodiment of the present invention.

DETAILED DESCRIPTION

The preferred embodiments for working the present invention are now explained in detail with reference to the attached drawings. The present invention, however, is not limited to the following examples, and allows various modifications and applications within the gist hereof.

First Embodiment

The first embodiment explains a remote copy system that selects, based on the operating status of a secondary storage system, either latest time among the times each attached to journals that the secondary storage system received or timestamp attached to a journal that was last stored in the secondary volume, and provide the selected time as a recovery point objective to a user of a computer system.

By way of this, since the user of the computer system can easily recognize a valid recovery point objective, even if a failure occurs in a primary site or in a communication line between a primary storage system and a secondary storage system, the user can accurately designate the recovery point objective without hesitating to make a decision. Consequently, data can be recovered with certainty.

Figure 1:
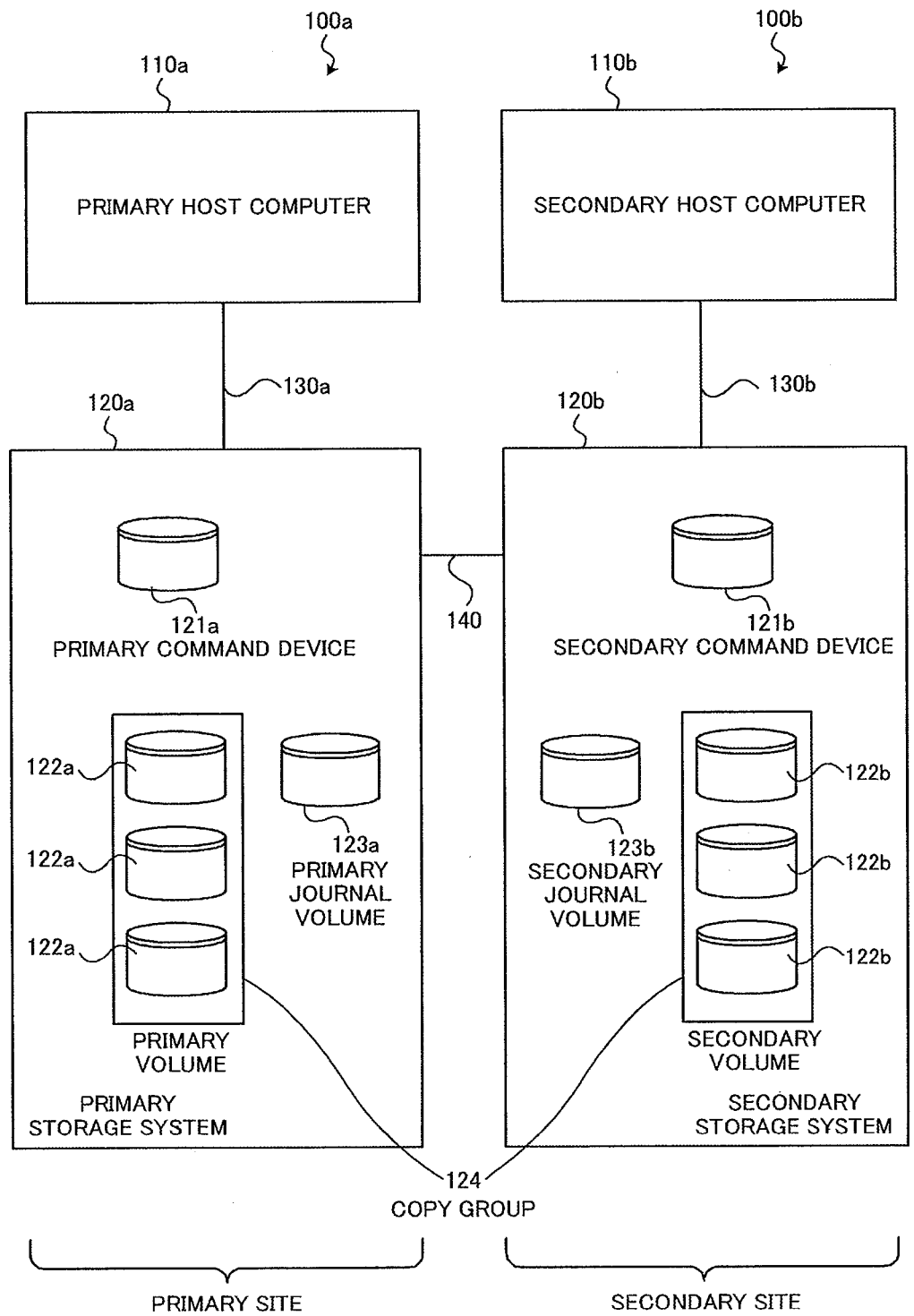
FIG. 1 is a diagram showing an overall configuration of a remote copy system according to an embodiment of the present invention.

FIG. 1 is a diagram showing an overall configuration of a remote copy system according to the first embodiment of the present invention. As shown in FIG. 1, the remote copy system of this embodiment is configured to include a computer system 100 at a primary site, and a computer system 100 at a secondary site located at a physically remote location from the primary site. Hereinafter, the computer system 100 located at the primary site is referred to as the "computer system 100a" whereas the computer system 100 located at the secondary site is referred to as the "computer system 100b." Other components or elements will be denoted in a like manner if it is necessary to particularly distinguish between them.

The computer system 100a comprises a primary host computer 110a and a primary storage system 120a. The secondary computer system 100b comprises a secondary host computer 110b and a secondary storage system 120b. Although FIG. 1 shows one primary host computer 110a and one secondary host computer 110b, the configuration of the present invention is not limited thereto. Likewise, a plurality of primary storage systems 120a and a plurality of secondary storage systems 120b may also be provided. In addition, the terms "primary" and "secondary" are used in the relative relationship between the components, and the computer system 100a as shown could serves as a secondary computer system in the relationship with another computer system that is not shown.

The primary host computer 110a and the primary storage system 120a are operatively interconnected with each other via a communication line 130a, and the secondary host computer 110b and the secondary storage system 120b are operatively interconnected with each other via a communication line 130b. Further, the primary storage system 120a and the secondary storage system 120b are operatively interconnected with each other via a communication line 140.

The primary storage system 120a includes a primary command device 121a, one or more primary volumes 122a, and one or more primary journal volumes 123a. The secondary storage system 120b also includes a secondary command device 121b, one or more secondary volumes 122b, and one or more secondary journal volumes 123b.

The primary command device 121a and the secondary command device 121b are respectively configured to receive various commands issued from the primary host computer 110a and the secondary host computer 110b. The primary command device 121a and the secondary command device 121b are used as special volumes for communicating with storage systems other than its own storage system.

The primary volume 122a stores data to be used by an application program in the primary host computer 110a. The secondary volume 122b is a replica or copy of the primary volume created with the remote copy function of the storage system.

The primary journal volume 123a is a volume for storing journals as update logs of the primary volume 122a. The primary storage system 120a writes journals into the primary journal volume 123a upon updating the primary volume 122a. The secondary journal volume 123b is a volume for storing journals acquired from the primary journal volume 123a via the communication line 140.

In execution of remote copy, one primary volume 122a and one secondary volume 122b forms a copy pair, and an aggregation of a plurality of copy pairs forms a copy group 124.

The configuration of the computer system 100 is now explained.

Figure 2:
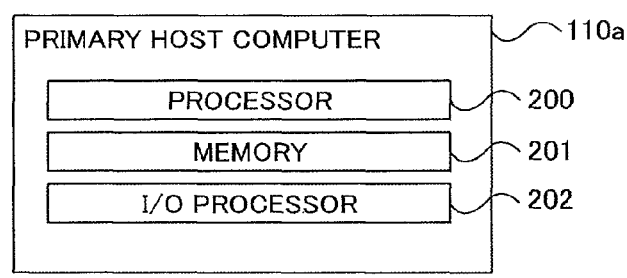
FIG. 2 is a diagram explaining a configuration of a primary host computer of a remote copy system according to an embodiment of the present invention.

FIG. 2 is a diagram explaining the configuration of the primary host computer 110a of the remote copy system according to the first embodiment of the present invention.

Referring to FIG. 2, the primary host computer 110a comprises a processor 200, a memory 201, and an I/O processor 202, and these components are connected with a communication path (not shown). The configuration of the secondary host computer 110b is the same as the primary host computer 110a.

Figure 3:
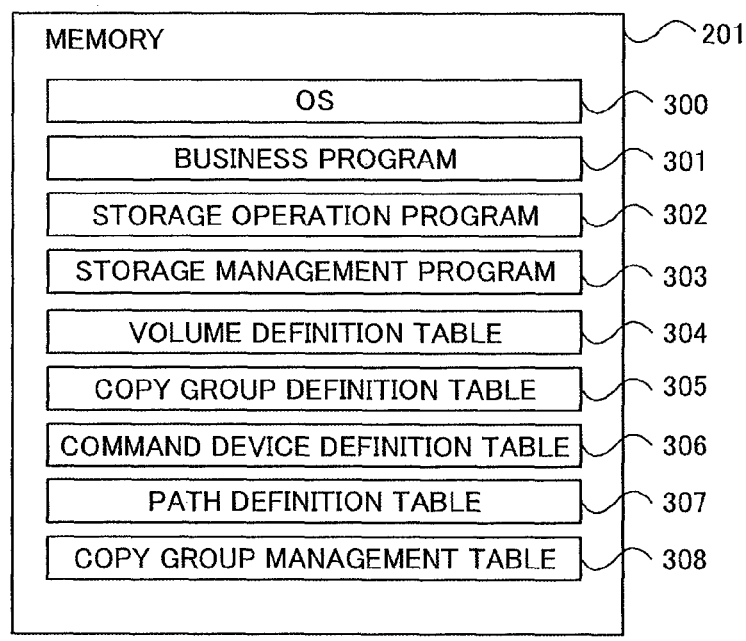
FIG. 3 is a diagram explaining the contents of a memory 201 of the primary host computer of a remote copy system according to an embodiment of the present invention.

FIG. 3 is a diagram explaining the contents of the memory 201 in the primary host computer 110a of the remote copy system according to the first embodiment of the present invention.

As shown in FIG. 3, the memory 201 stores an OS 300, a business program 301, a storage operation program 302, a storage management program 303, a volume definition table 304, a copy group definition table 305, a command device definition table 306, a path definition table 307, and a copy group management table 308.

The business program 301 is an application program running on the OS 300 that reads and writes data from and into the primary volume 122a.

The storage operation program 302 is an application program running on the OS 300. The storage operation program 302 uses the volume copy processing provided by the storage management program 303, and creates a replication of a volume from the primary volume to the secondary volume according to the operational rules of the computer system.

The storage management program 303 is also an application program of the OS 300. The storage management program 303 provides processing for performing volume copy control of the storage system to the storage operation program 302.

The volume definition table 304, the copy group definition table 305, the command device definition table 306, and the path definition table 307 are dedicated control tables that are created by the storage management program 303. These tables may also be stored in a volume that is readable and writable from the OS 300.

The copy group management table 308 is an area that is set when pair status acquisition processing provided by the storage management program 303 is invoked, and stores the status of the storage system. The storage operation program 302 refers to the area and acquires the status of the storage system.

These programs and tables may also exist in a separate primary host computer 110a connected to the primary storage system 120a. The secondary host computer 110b may also retain similar contents in its memory 201b.

Figure 4:
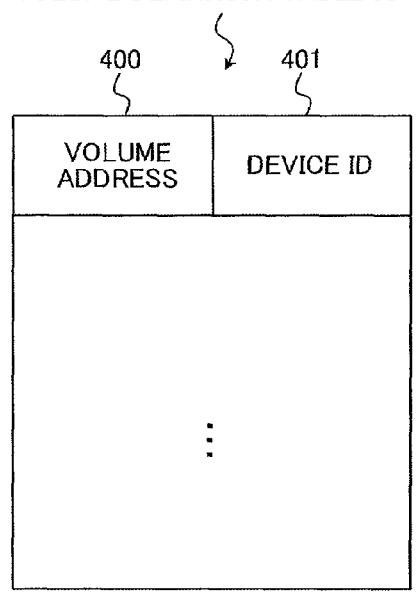
FIG. 4 is a diagram showing an exemplary volume definition table retained in a host computer of a remote copy system according to an embodiment of the present invention.

FIG. 4 is a diagram showing an example of the volume definition table 304 retained by the host computer in the remote copy system according to the first embodiment of the present invention. The volume definition table 304 defines the volumes to be handled by the storage management program 303, and also associates the apparatus address managed by the OS 300 and the apparatus address managed by the storage system.

Specifically, as shown in FIG. 4, the volume definition table 304 has one or more entries including a volume address 400 and a device ID 401. The volume address 400 is an address for the storage system to identify the apparatus. The device ID 401 is an address to be identified by the OS 300 on which the storage management program 303 is running.

The storage system 120 and the OS 300 generally recognize apparatuses using respectively different information. Thus, for the purpose of explanation, the apparatus recognized by the storage system 110 is referred to as a "volume address," and the apparatus address recognized by the OS 300 is referred to as a "device ID."

FIG. 5 is a diagram showing an example of the copy group definition table 305 expanded in the memory 201 of the host computer 110 of the remote copy system according to the first embodiment of the present invention. The copy group definition table 305 is a table for defining the copy group 124.

Specifically, as shown in FIG. 5, the copy group definition table 305 includes a copy group ID 500, a primary copy ID 501, a secondary copy ID 502, a primary volume address 503, and a secondary volume address 504.

The copy group ID 500 is an identifier for uniquely identifying the copy group 124, and is used by the storage operation program 302 to select the copy group 124.

The primary copy ID 501 is a resource of the primary storage system 120a and an identifier associated with one or more journal volumes 123a belonging to the primary storage system 120a, and the secondary copy ID 502 is a resource of the secondary storage system 120b and an identifier associated with one or more journal volumes 123b belonging to the secondary storage system 120b. When viewed from the application program of the host computer 110, the primary copy ID 501 and the secondary copy ID 502 are respectively units for guaranteeing the writing order into the volume.

The primary volume address 503 is a volume address of the primary volume 122a included in the copy group 124. The secondary volume address 504 is a volume address of the secondary volume 122b.

At least one primary copy ID 501 and one secondary copy ID 5021 should exist for one copy group ID 500. There is only one secondary volume address 504 that can be a copy pair with one primary volume address 503. The copy group 124 may include one or more copy pairs. In other words, pairs of one or more primary volume addresses 503 and secondary volume addresses 504 may exist for one copy group ID 500.

There may be a plurality of copy group IDs 500 in the copy group definition table 305.

Figure 6:
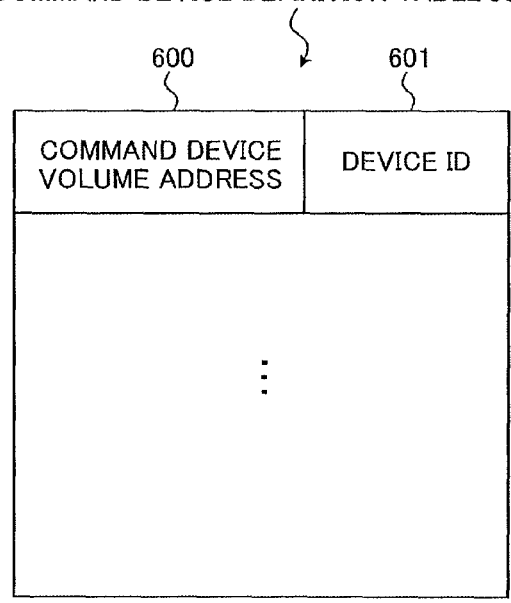
FIG. 6 is a diagram showing an exemplary command device definition table retained in a host computer of a remote copy system according to an embodiment of the present invention.

FIG. 6 is a diagram showing an example of the command device definition table 306 retained by the host computer 110 of the remote copy system according to the first embodiment of the present invention. The command device definition table 306 is a table for defining the command device.

Specifically, as shown in FIG. 6, the command device definition table 306 includes a command device volume address 600 and a device ID 601. The command device volume address 600 is a volume address of the command device belonging to the storage system. The device ID 601 is a device ID of the command device.

Figure 7:
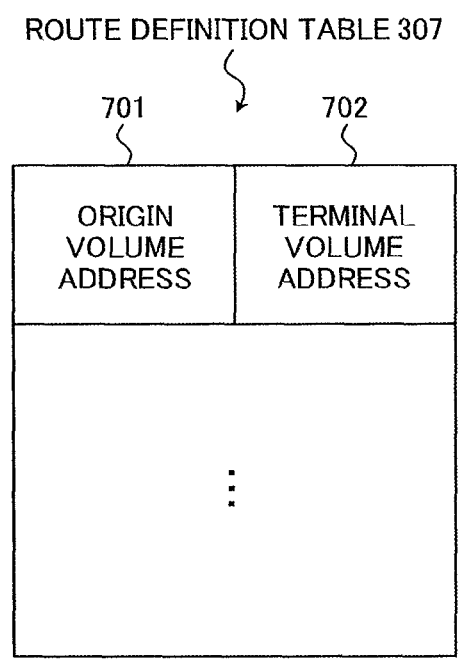
FIG. 7 is a diagram showing an exemplary path definition table retained in a host computer of a remote copy system according to an embodiment of the present invention.

FIG. 7 is a diagram showing an example of the path definition table 307 retained by the host computer 110 in the remote copy system according to the first embodiment of the present invention. The path definition table 307 is a table for defining the communication path between command devices. By defining the communication path, the storage management program 303 is able to perform volume copy control and status acquisition to the volumes of a storage system that cannot be managed with the OS located at a remote site.

Specifically, as shown in FIG. 7, the path definition table 307 includes an origin volume address 701 and a terminal volume address 702. The origin volume address 701 designates the volume address of the command device to issue the command. The terminal volume address 702 designates the volume address of the command device to receive the command.

FIG. 8 is a diagram showing an example of the copy group management table 308 retained by the host computer 110 in the remote copy system according to the first embodiment of the present invention.

As shown in FIG. 8, the copy group management table 308 includes a copy group ID 800, a primary copy ID 801, a secondary copy ID 802, a primary volume address 803, a secondary volume address 804, a pair status 805, and a consistency time 806.

The copy group management table 308 is an area for storing the processing result of the pair status acquisition module 2704 shown in FIG. 27 explained later. Thus, the copy group ID 800, the primary copy ID 801, the secondary copy ID 802, the primary volume address 803, and the secondary volume address 804 are configured the same as the copy group definition table 305.

The pair status 805 is a status of the copy pair belonging to the copy group. The consistency time 806 represents the recovery point objective of the copy group.

The configuration of the storage system 120 is now explained.

Figure 9:
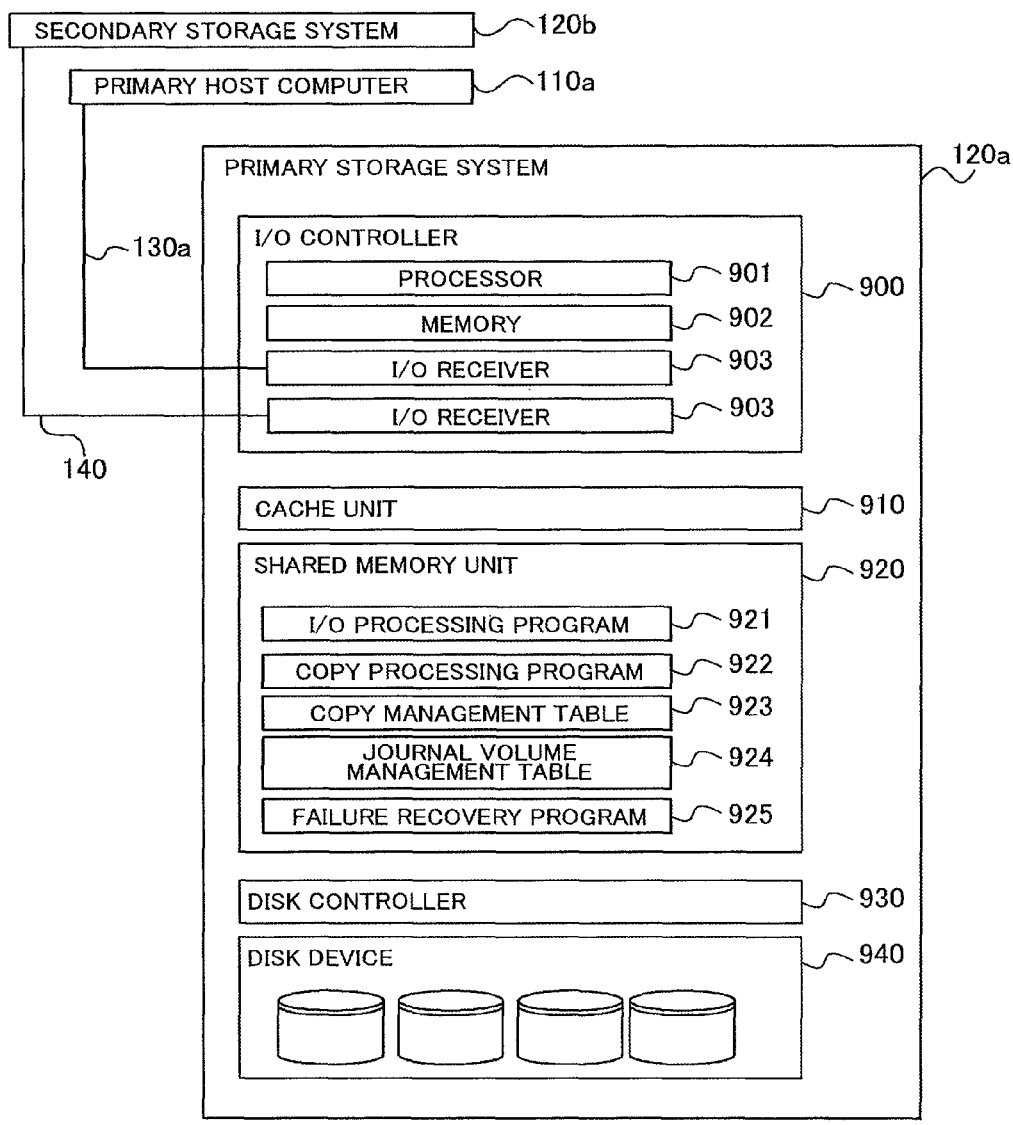
FIG. 9 is a diagram showing a configuration of a primary storage system in a remote copy system according to an embodiment of the present invention.

FIG. 9 is a diagram showing the configuration of the primary storage system 120a in the remote copy system according to the first embodiment of the present invention.

Referring to FIG. 9, the primary storage system 120a comprises an I/O controller 900, a cache unit 910, a shared memory unit 920, a disk controller 930, and a disk device unit 940.

The I/O controller 900 comprises a processor 901, a memory 902, and an I/O receiver 903. The I/O receiver 903 is connected to the primary host computer 110a and the secondary storage system 120b via the communication lines 130 and 140, respectively.

The shared memory unit 920 stores an I/O processing program 921 for writing data into a volume, a copy processing program 922 for performs the remote copy, a copy management table 923 and a journal volume management table 924 as the control tables of the copy processing program 922, and a failure recovery program 925 to handle the processing if a failure occurs in the storage system.

The copy management table 923 and the journal volume management table 924 are tables for retaining the status of the copy group and the status of the journal volume, respectively. Details concerning these tables will be explained later.

The secondary storage system 120b also comprises an I/O controller 900, a cache unit 910, a shared memory unit 920, a disk controller 930, and a disk device unit 940 as with the primary storage system 120a.

Figure 10:
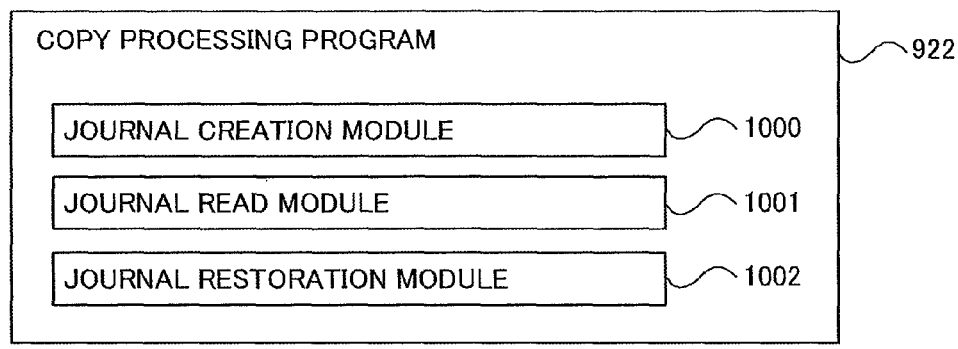
FIG. 10 is a diagram showing a configuration of a copy processing program of a storage system according to an embodiment of the present invention.

FIG. 10 is a diagram showing the configuration of the copy processing program 922 of the storage system 100 according to the first embodiment of the present invention. As shown in FIG. 10, the copy processing program 922 comprises a journal creation module 1000, a journal read module 1001, and a journal restoration module 1002. The processing contents of the respective modules of the copy processing program 922 will be described later.

The control tables in the storage system are now explained.

Figure 11A:
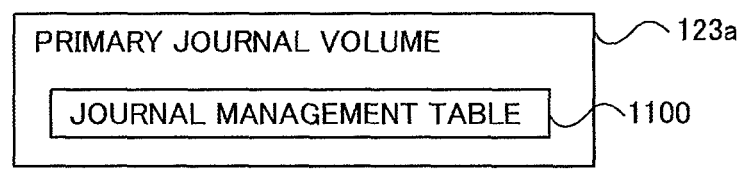
FIG. 11A is a diagram showing a primary journal volume retained in a storage system of a remote copy system according to an embodiment of the present invention.

FIG. 11A is a diagram showing the primary journal volume 123a retained by the storage system 110a in the remote copy system according to the first embodiment of the present invention.

As shown in FIG. 11, the primary journal volume 123a includes a journal management table 1100 for managing the update history of the primary volume 122a.

Figure 11B:
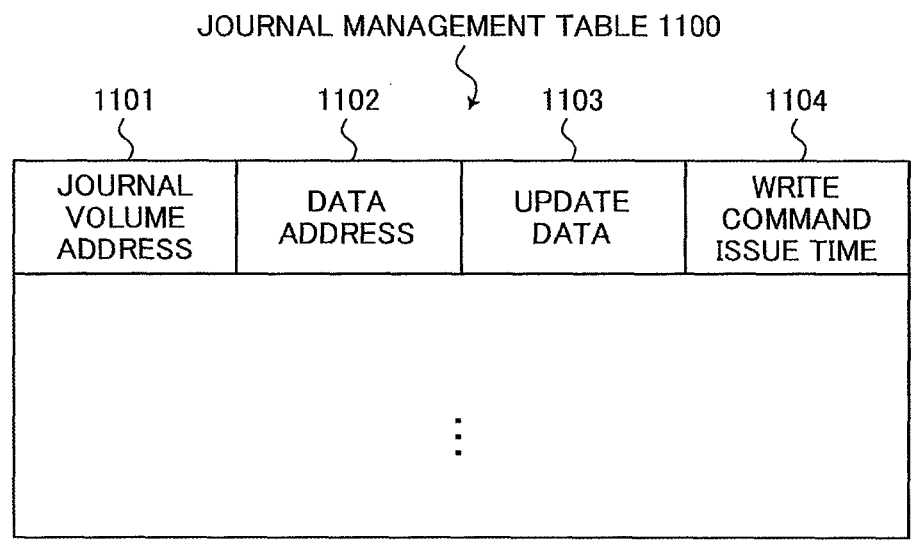
FIG. 11B is a diagram showing an example of a journal management table of a primary journal volume in a remote copy system according to an embodiment of the present invention.

The journal management table 1100 includes, as shown in FIG. 11B, a journal volume address 1101, a data address 1102, an update data 1103, and a write command issue time 1104.

The journal volume address 1101 and the data address 1102 are addresses to which data was written according to the write command, respectively. The update data 1103 is data that was written according to the write command of the primary volume 122a. The write command issue time 1104 is the time that is added to a write command when the OS 300 issues such write command.

The secondary journal volume 123b of the secondary storage system 110b also has the same configuration.

FIG. 12 is a diagram showing the copy management table 923 retained by the storage system 10 in the remote copy system according to the first embodiment of the present invention. The copy management table 923 is a table that is retained by the primary storage system 120a and the secondary storage system 120b, respectively, and used for managing the status of the copy pairs included in the copy group.

The copy management table 923 includes a primary copy ID 1200, a secondary copy ID 1201, a primary volume address 1202, a secondary volume address 1203, a pair status 1204, a restoration finish time 1205, and a validity flag 1206.

The primary copy ID 1200 and the secondary copy ID 1201 are identifiers for identifying each copy group, which is a resource of either the primary storage system 120a or the secondary storage system 120b.

The primary volume address 1202 and the secondary volume address 1203 are addresses of the primary volume 122a and the secondary volume 122b configuring a copy pair.

The pair status 1204 shows the copy pair status. The copy pair status indicates any one of, among others, a Simplex status, a Copying status, a Duplex status, a Suspending status, a Suspend-Operation status, a Deleting status, and a Suspend-Failure status. The pair status 1204 shows the result of recording and updating the pair status of the copy group 124 created from the primary storage volume 122a and the secondary storage volume 122b in the pair creation processing (FIG. 16) and the pair status acquisition processing (FIG. 20A) described later. In other words, the "Copying status" is recorded in the pair creation processing, and the pair status during the pair status acquisition processing is updated to the pair status such as "Copying" or "Suspend-Failure" in the pair status acquisition processing. The relationship among the respective copy pair statuses will be described later with reference to FIG. 28.

The restoration finish time 1205 is set as the time attached to a journal when such journal stored in the secondary journal volume 123b is reflected in the secondary volume 122b with the journal restoration module 1002 of the copy processing program 922.

The validity flag 1206 is a flag showing whether the restoration finish time 1205 is valid or invalid.

FIG. 13 is a diagram showing the journal volume management table 924 retained by the storage system 120 in the remote copy system according to the first embodiment of the present invention.

As shown in FIG. 13, the journal volume management table 924 includes a copy ID 1300, a volume address 1301, a volume status 1302, a journal reception time 1303, and a validity flag 1304.

The volume status 1302 shows the status regarding whether that volume is currently subject to a failure. The journal reception time 1303 is an area for setting the latest time among the time attached to the received journal. In the journal volume management table 924b of the secondary storage system 120b, the time attached to the latest journal received from the primary storage system 120a will be the journal reception time 1303. The validity flag 1304 is a flag indicating whether the journal reception time 1303 is valid.

The storage management program 303 of the host computer 110 is explained as follows.

Figure 27:
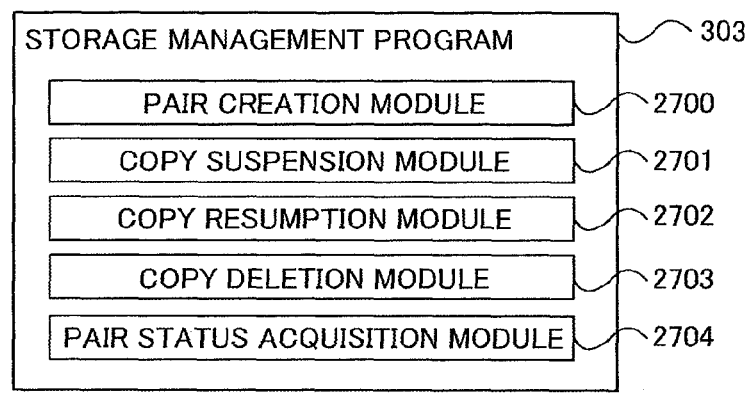
FIG. 27 is a diagram showing a configuration of a storage management program in a host computer according to an embodiment of the present invention.

FIG. 27 is a diagram showing the storage management program 303 of the host computer 110 according to the first embodiment of the present invention.

As shown in FIG. 27, the storage management program 303 comprises a pair creation module 2700, a copy suspension module 2701, a copy resumption module 2702, a copy deletion module 2703, and a pair status acquisition module 2704. The storage management program 303 issues commands created by these modules to the storage system 120.

The pair creation module 2700 performs processing for changing the copy pair in a Simplex status, in which remote copy has not been started, into a Duplex status. In the case of a Simplex status, the update of the primary volume 122a is not reflected in the secondary volume 122b. When the copy pair becomes a Duplex status, the update is reflected in the secondary volume 122b.

The copy suspension module 2701 performs processing for temporarily suspending the remote copy of the copy pair in a Duplex status. The copy suspension module 2701 can be used upon determining the point in time to which the secondary volume 122b belongs. Namely, the copy suspension module 2701 can be used upon determining the data of which point in time is to be reflected in the secondary volume, or when a system failure or a communication failure occurs.

The copy resumption module 2702 performs processing of resuming the remote copy of the copy pair in which the remote copy was of a temporarily suspended status due to copy suspension processing or occurrence of a failure.

The copy deletion module 2703 performs processing of deleting the remote copy and changing the copy pair to a Simplex status.

The pair status acquisition module 2704 performs processing for acquiring the copy pair status. The pair statuses to be acquired by the pair status acquisition module 2704 will be described later.

Figure 28:
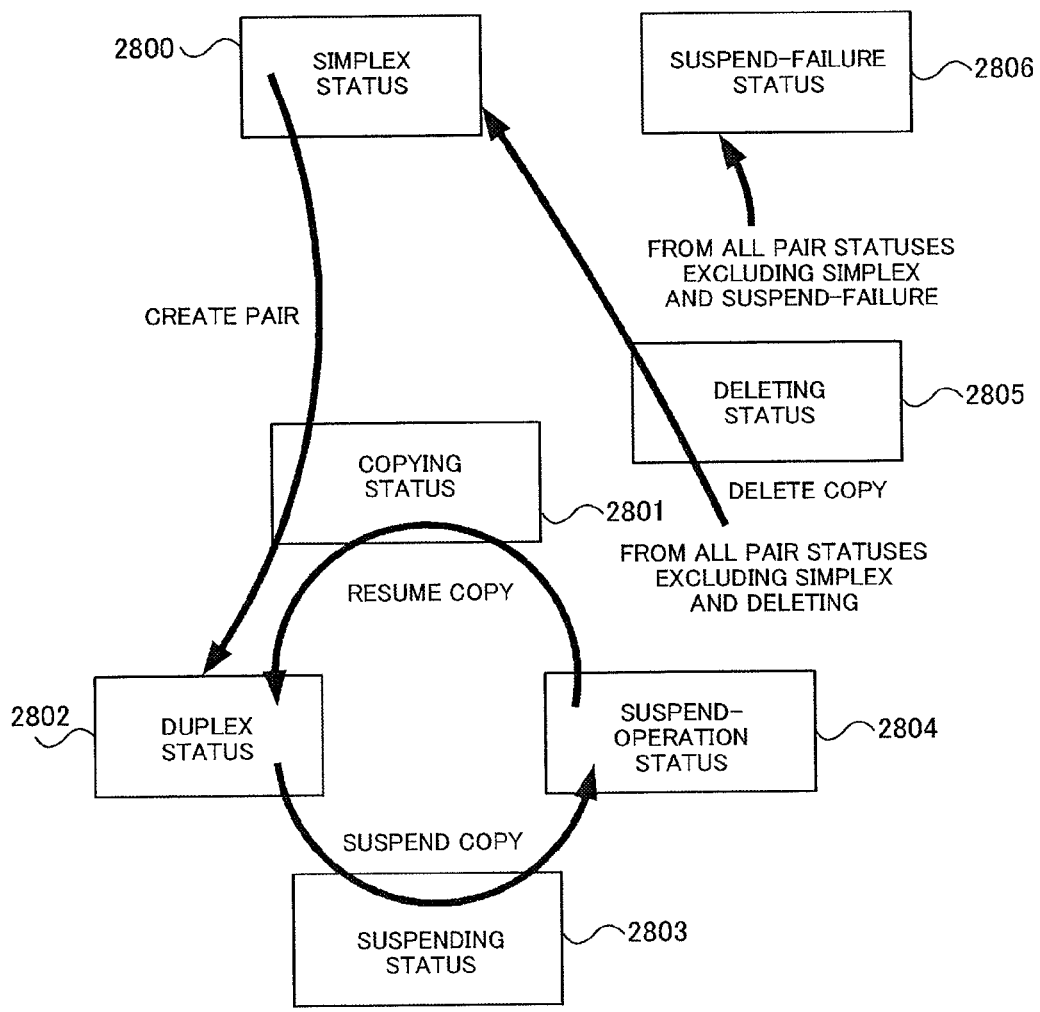
FIG. 28 is a diagram explaining copy pair statuses in a remote copy system according to an embodiment of the present invention.

FIG. 28 is a diagram explaining the copy pair statuses in the remote copy system according to the first embodiment of the present invention.

The copy pair status (sometimes also referred to as a "pair status") includes a Simplex status 2800, a Copying status 2801, a Duplex status 2802, a Suspending status 2803, a Suspend-Operation status 2804, a Deleting status 2805, and a Suspend-Failure status 2806.

The Simplex status 2800 is an initial status before configuring the copy pair. In addition, if pair deletion processing is executed to a copy pair to which remote copy has already been configured, this will also be a Simplex status.

The Duplex status 2802 is a status where the primary volume 122a and the secondary volume 122b are duplexed. If the copy pair is a Duplex status, writing of data into the primary volume 122a will be reflected in the secondary volume 122b.

The Copying status 2801 is a transitional status showing that the creation/copy based on the processing of the pair creation module 2700 is being executed, or that the differential copy based on the processing of the copy resumption module 2702 is being executed. When the creation/copy or the differential copy is complete, the copy pair status changes to a Duplex status.

The Suspend-Operation status 2804 is a status where the storage management program 303 temporarily suspended the remote copy based on the processing of the copy suspension module 2701.

The Suspending status 2803 is a transitional status until changing to the Suspend-Operation status when the copy suspension module 2701 performs processing to the copy pair of a Duplex status.

The Deleting status 2805 is a transitional status until changing to the Simplex status based on the processing of the copy deletion module 2703. A copy pair changes to this status other than from the Simplex status 2800 and the Deleting status 2805.

The Suspend-Failure status 2806 is a status where the duplexing (remote copy) of the primary volume 122a and the secondary volume 122b is temporarily suspended due to a hardware failure. A copy pair changes to this status other than from the Simplex status and the Suspend-Failure status.

Figure 29:
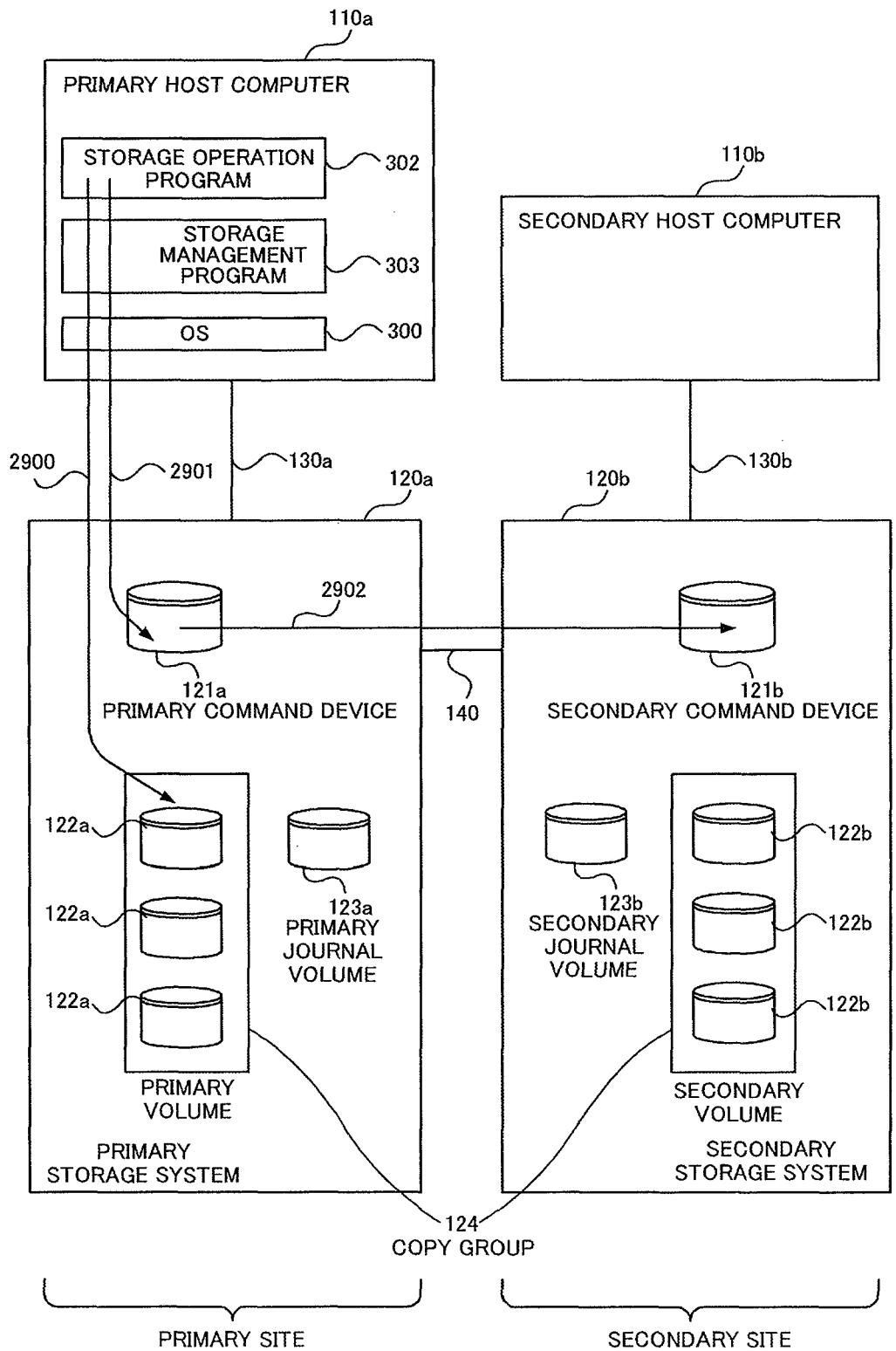
FIG. 29 is a diagram explaining copy group operation in a remote copy system according to an embodiment of the present invention.

FIG. 29 is a diagram explaining the operation concerning a copy group in the remote copy system according to the first embodiment of the present invention. FIG. 29 shows the command path upon the storage operation program 302 running on the primary host computer 110a using the processing provided by the respective modules of the storage management program 303 and operating the copy group. As the command path, there is a path (2900) for sending a command to the primary volume 122a and a path (2901) for sending a command to the primary command device 121a.

Referring to FIG. 29, foremost, the storage operation program 302 calls a module corresponding to the storage management program 303, and the storage management program 303 creates a command to the primary storage system and uses the I/O function provided by the OS 300 to issue a prescribed I/O command to the primary volume (2900). In addition, the storage management program 303 may issue a prescribed I/O command to the primary command device 121a (2901). Prescribed I/O commands will be explained with reference to FIG. 14A to FIG. 14F.

The storage management program 303 receives the result to the prescribed I/O command from the OS 300, and reports the result to the storage operation program 302.

If an I/O command is issued to the command device 121a, the I/O command can be transferred to storage systems other than the storage system connected to itself. In this case, the I/O command is transferred from the primary command device 121a to the secondary command device 121b (2902). By transferring the I/O command to storage systems other than the storage system connected to itself via the communication line 140, the storage management program 303 executes remote copy processing to a copy group of the storage system that is not directly connected to itself.

The storage management program running on the secondary host computer 110b can also execute the same processing as the storage management program running on the primary host computer 110a by issuing an I/O command to the secondary volume 122b or the secondary command device 121b.

The flow of this kind of data processing is executed with the copy processing program 922 stored in the shared memory unit 920.

Figure 30:
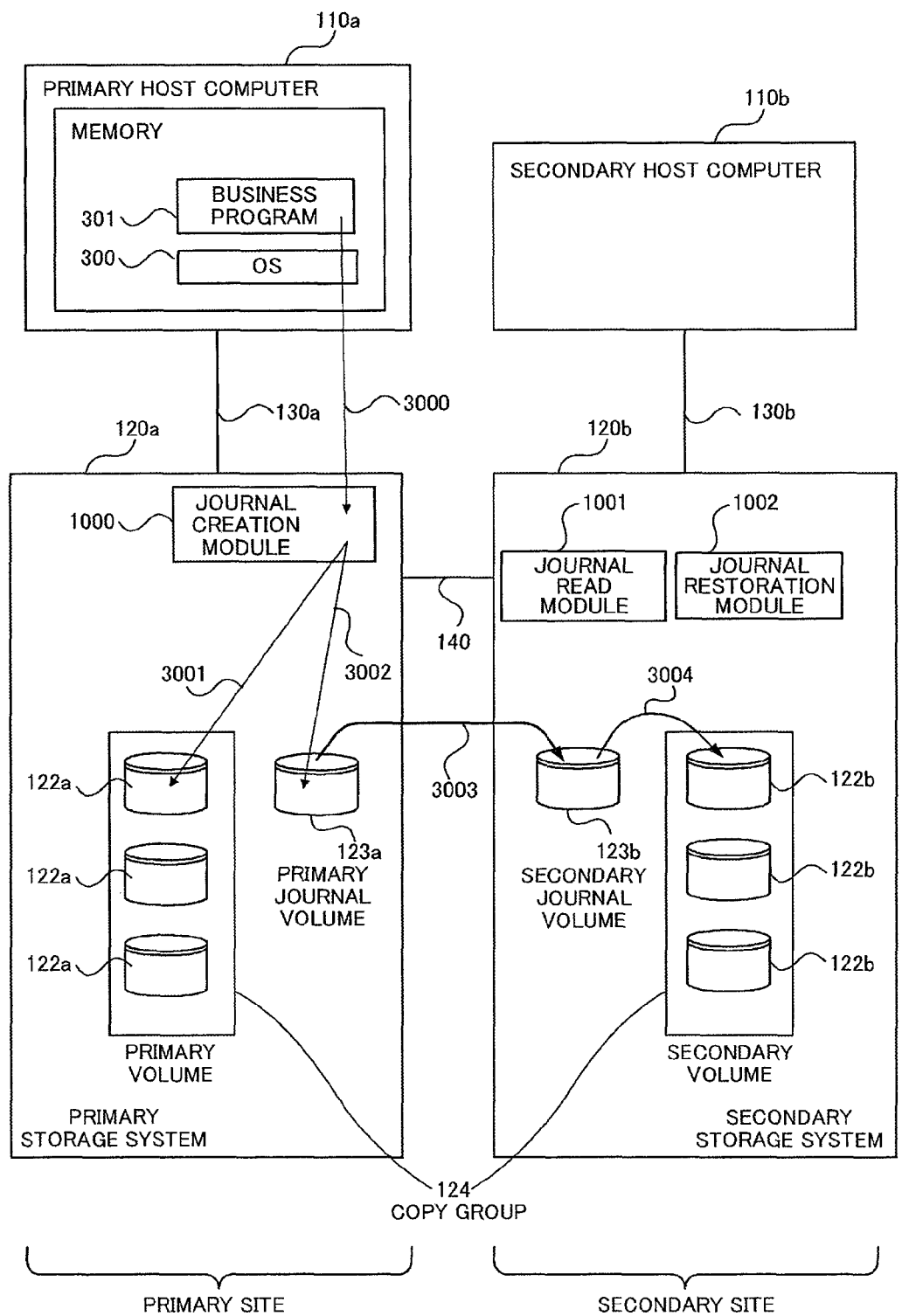
FIG. 30 is a diagram explaining remote copy processing in a remote copy system according to an embodiment of the present invention.

FIG. 30 is a diagram explaining the remote copy processing in the remote copy system according to the first embodiment of the present invention. Specifically, FIG. 30 explains the flow of data when data that is written into the primary volume 122a with the business program 301 running on the primary host computer 110a is also written into the secondary volume 122b in a case where the copy pair status in the remote copy system is a Duplex status.

Referring to FIG. 30, when the business program 301 running on the primary host computer 110a requests the OS 300 to perform write processing to data of the primary volume 122a, the OS 300 issues a write command to the primary volume 122a (3000). At this time, the OS 300 adds the time (time stamp) that the command was issued to the write command. When the primary storage system 120a receives the write command, the journal creation module 1000 writes the contents of the write command into the primary volume 122a (3001), creates a journal based on the time added to the write command, writes this journal into the primary journal volume 123a (3002), and sends an I/O command completion report to the OS 300.

Meanwhile, on the side of the secondary storage subsystem 122b, the journal read module 1001 reads the journal from the primary journal volume 123a and writes it into the secondary journal volume 123b (3003).

Finally, the journal restoration module 1002 reflects the journals, which are stored in the secondary journal volume 123b, in the secondary volume 122b sequentially according to the time added to the journal (3004).

By way of this, the write command that was written into the primary volume is reflected in the secondary volume in the same sequence as the update sequence of the primary volume.

The various I/O commands used in the remote copy system of this embodiment are now explained. As the I/O commands, there may, for instance, be a write command issued by the OS 300 that received a write request of data from the business program 301, and the various commands concerning remote copy that are created by the respective modules 2700 to 2704 of the storage management program 303.

Figure 14E:
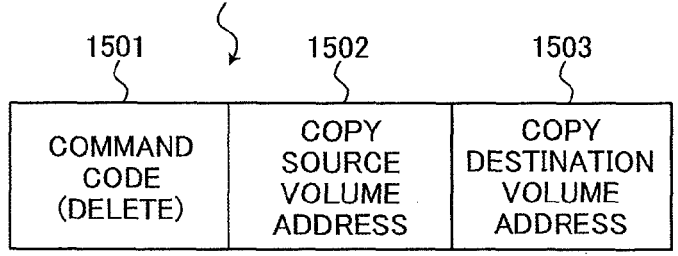
FIG. 14E is a diagram showing an example of an I/O command format to be used in a remote copy system according to an embodiment of the present invention.
Figure 14F:
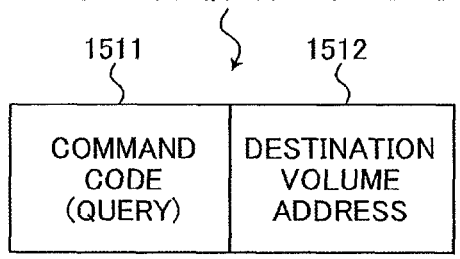
FIG. 14F is a diagram showing an example of an I/O command format to be used in a remote copy system according to an embodiment of the present invention.

FIGS. 14A-14F are diagrams explaining the I/O commands used in the remote copy system according to the first embodiment of the present invention. Specifically, FIG. 14A shows an example of a format of a write command 1400, FIG. 14B shows an example of a format of a pair creation command 1410, FIG. 14C shows an example of a format of a copy suspension command 1420, and FIG. 14D shows an example of a format of a copy resumption command 1430. Moreover, FIG. 14E shows an example of a format of the copy deletion command 1500, and FIG. 14F shows an example of a format of a pair status acquisition command 1510.

The write command 1400 shown in FIG. 14A includes a command code 1401, a command control table 1402, and a write command issue time 1403. The command issue time is time information added by the OS 300.

The pair creation command 1410 shown in FIG. 14B includes a command code 1411, a primary copy ID 1412, a secondary copy ID 1413, a copy source volume address 1414, and a copy destination volume address 1415. The copy source volume address 1414 and the copy destination volume address 1415 are the volume address of the primary volume 122a and the volume address of the secondary volume 122b configuring a copy pair, respectively.

The copy suspension command 1420 shown in FIG. 14C includes a command code 1421, an execution mode 1422, a copy source volume address 1423, a copy destination volume address 1424, and a pair suspension command issue time 1425. The execution mode 1422 designates the handling of a journal that was written into the primary volume 122a but not reflected in the secondary volume 122b. Specifically, the attribute of either "Flush" or "Purge" is at least designated. "Flush" is a designation for reflecting the journals before the time set as the pair suspension command issue time 1425 in the secondary volume, and then changing the copy pair to a Suspend-Operation status 2804 (FIG. 28). In contrast, "Purge" is a designation for discarding the journals at the point in time that the storage system receives a pair suspension command, and immediately changing the copy pair to a Suspend-Operation status 2804 (FIG. 28).

Since the journals are discarded when "Purge" is designated, the time added to the journal cannot be used as the recovery point objective (consistency time). In this case, the latest time of the journal reflected in the secondary volume will be the recovery point objective.

The copy source volume address 1423 and the copy destination volume address 1424 are the volume address of the primary volume and the volume address of the secondary volume configuring a copy pair, respectively. The pair suspension command issue time 1425 is the time that the pair suspension command 1420 will be issued.

The copy resumption command 1430 shown in FIG. 14D includes a command code 1431, a copy source volume address 1432, and a copy destination volume address 1433.

The copy deletion command 1500 shown in FIG. 14E includes a command code 1501, a copy source volume address 1502 and a copy destination volume address 1503. The copy source volume address 1502 and the copy destination volume address 1503 are the volume address of the primary volume and the volume address of the secondary volume configuring a copy pair, respectively.

The pair status acquisition command 1510 shown in FIG. 14F includes a command code 1511 and an address volume address 1512. When the storage management program 303 issue the pair status acquisition command 1510 under the instructions of the storage operation program 302, the copy processing program 922 of the storage system 120 that received the command creates and returns a pair status table 1520.

Figure 15:
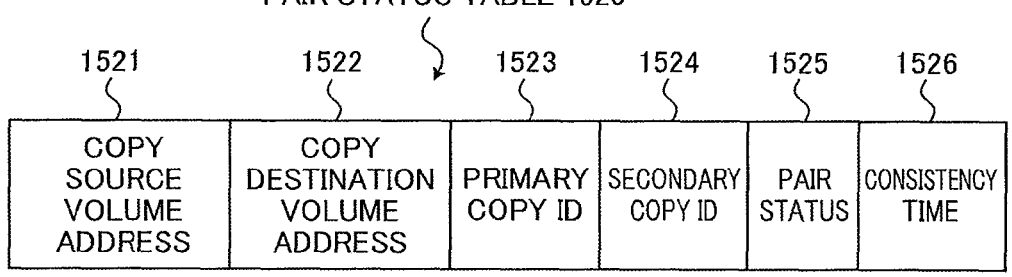
FIG. 15 is a diagram explaining a pair status table in a remote copy system according to an embodiment of the present invention.

FIG. 15 is a diagram explaining the pair status table 1520 in the remote copy system according to the first embodiment of the present invention. The pair status table 1520 indicates a result in response to the pair status acquisition command.

As shown in FIG. 15, the pair status table 1520 includes a copy source volume address 1521, a copy destination volume address 1522, a primary copy ID 1523, a secondary copy ID 1524, a pair status 1525, and a consistency time 1526. In this embodiment, the consistency time 1526 is the recovery point objective.

The various processing operations of the remote copy system of this embodiment are now explained with reference to the flowcharts shown in FIG. 16 to FIG. 22.

With the remote copy system of this embodiment, if a failure occurs during any one of the write I/O processing, pair creation processing, copy suspension processing, copy resumption processing, and copy deletion processing, or if a failure occurs in the journal volume, the copy processing program 922 updates the copy management table 923 and the journal volume management table 924. When the pair status acquisition processing is executed, the copy processing program 922 makes a reply be setting a recovery point objective (consistency time) in the pair status table 1520 according to the status of the copy management table 923 and the journal volume management table 924.

Figure 16:
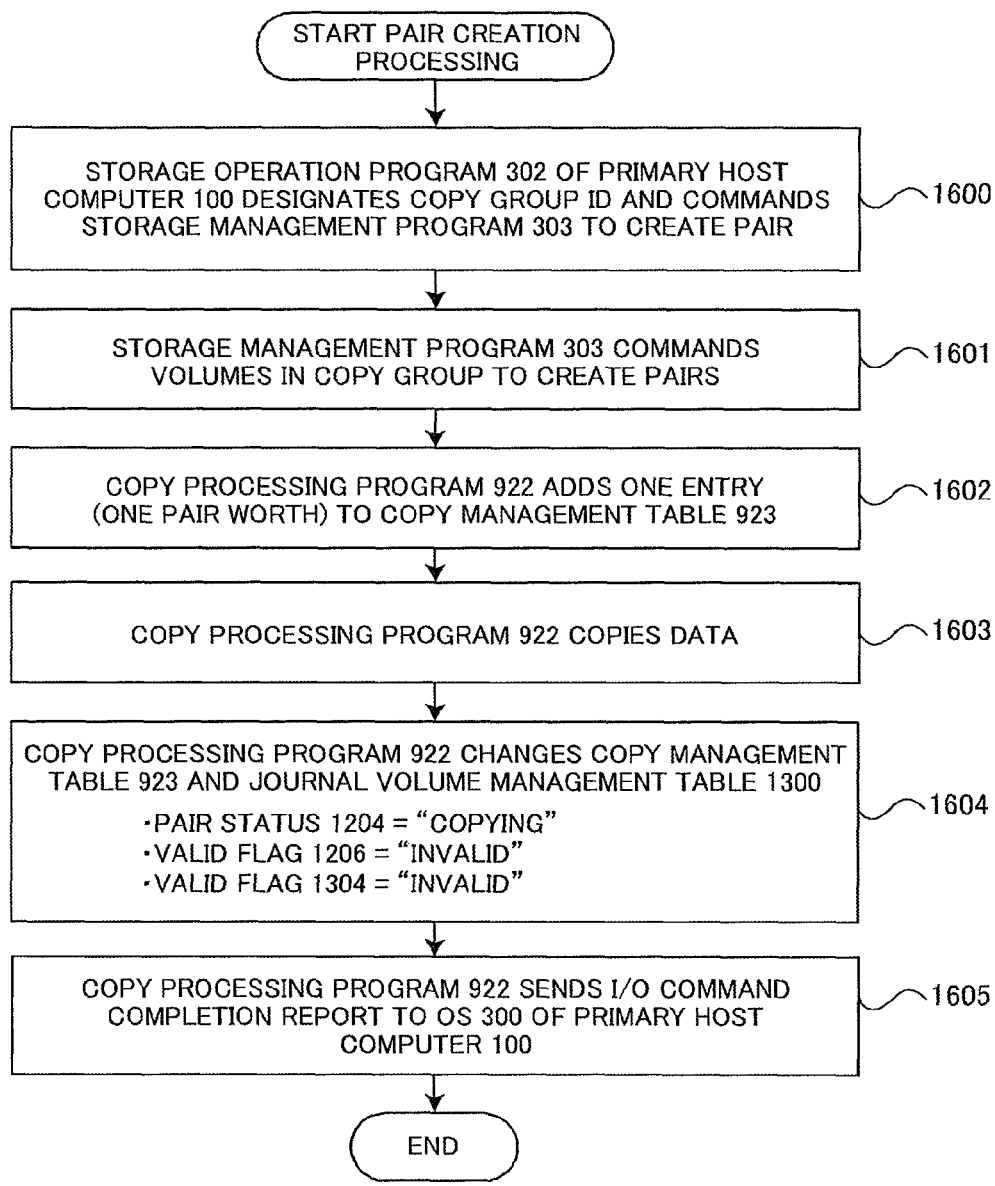
FIG. 16 is a flowchart explaining pair creation processing in the remote copy system according to an embodiment of the present invention.

FIG. 16 is a flowchart explaining the pair creation processing in the remote copy system according to the first embodiment of the present invention.

Referring to FIG. 16, foremost, the storage operation program 302 running on the primary host computer 110a designates the copy group ID 5007 and commands the storage management program 303 to create a pair (1600). Upon receiving this command, the storage management program 303 commands the volumes in the copy group to create pairs (1601).

In response to this, the copy processing program 922 of the primary storage system 120a adds one pair worth of entries to the copy management table 923 (1602).

Subsequently, the copy processing program 922 executes the remote copy of data in the primary volume 122a (1603). Remote copy is performed by transferring journals. In conjunction with this, the copy processing program 922 updates the copy management table 923 and the journal volume management table 924 (1604). Specifically, the copy processing program 922 sets the pair status 1204 of the copy management table 923 to "Copying," and sets the valid flag 1206 to "invalid." The copy processing program 922 sets the valid flag 1304 of the journal volume management table 924 to "invalid." When the data copy is complete, the copy processing program 922 sends an I/O command completion report to the OS 300 of the primary host computer 110a (1605).

Figure 17:
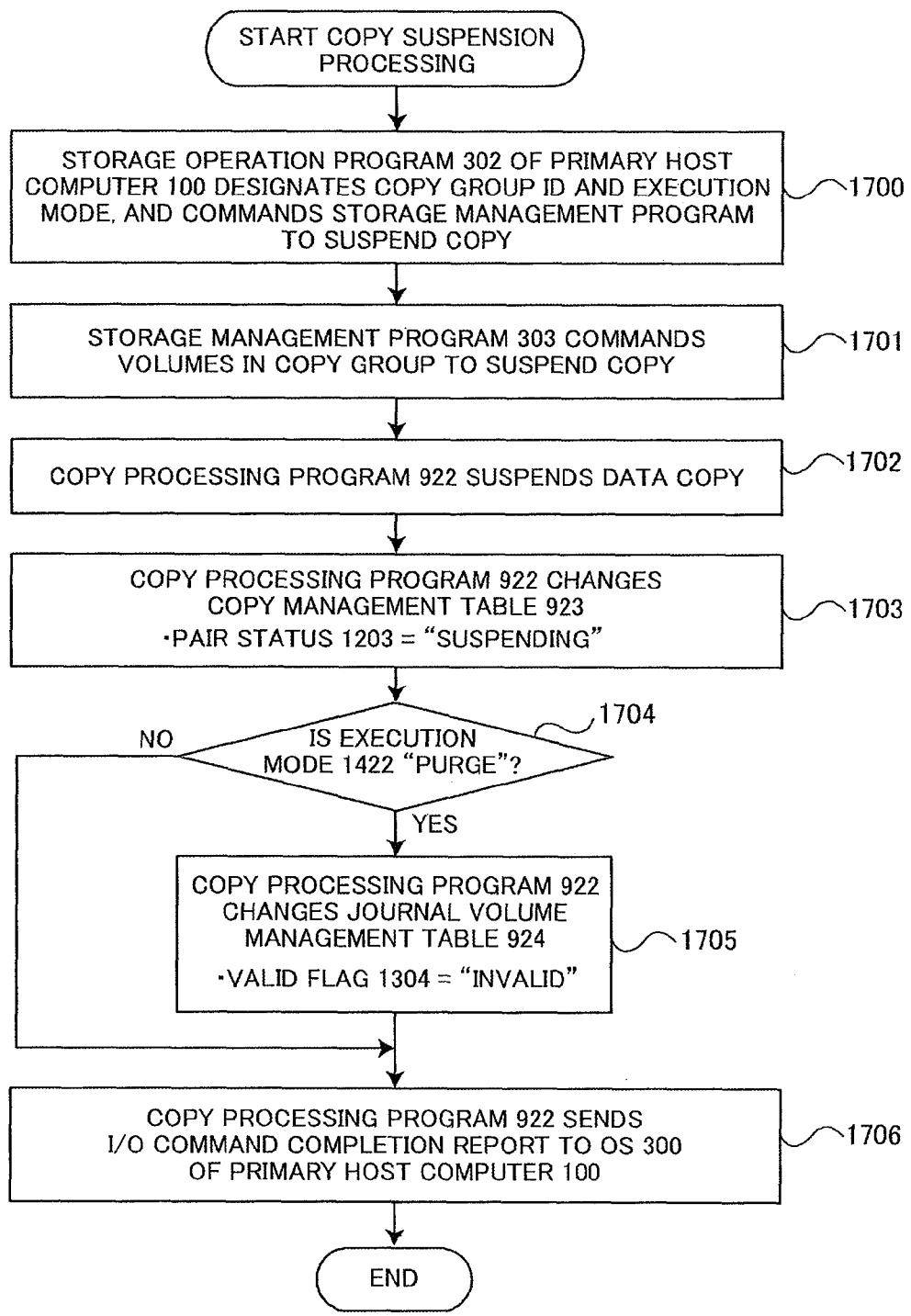
FIG. 17 is a flowchart explaining copy suspension processing in a remote copy system according to an embodiment of the present invention.

FIG. 17 is a flowchart showing the copy suspension processing in the remote copy system according to the first embodiment of the present invention.

Referring to FIG. 17, the storage operation program 302 of the primary host computer 110a designates the copy group ID 500 and the execution mode 1422, and commands the storage operation program 302 to suspend copy (1700). Upon receiving this command, the storage management program 303 commands the volumes in the copy group to suspend copy (1701).

In response, the copy processing program 922 subsequently suspends the data copy (1702). In conjunction with this, the copy processing program 922 updates the copy management table 923 (1703). Specifically, the copy processing program 922 sets the pair status 1204 of the copy management table 923 to "Suspending." In addition, the copy processing program 922 checks the execution mode 1422 (1704) and, if the mode is "Purge," it sets the valid flag 1304 of the journal volume management table 924 to "invalid" (1705).

The copy processing program 922 thereafter sends an I/O command completion report to the OS 300 of the primary host computer 110a (1706).

Figure 18:
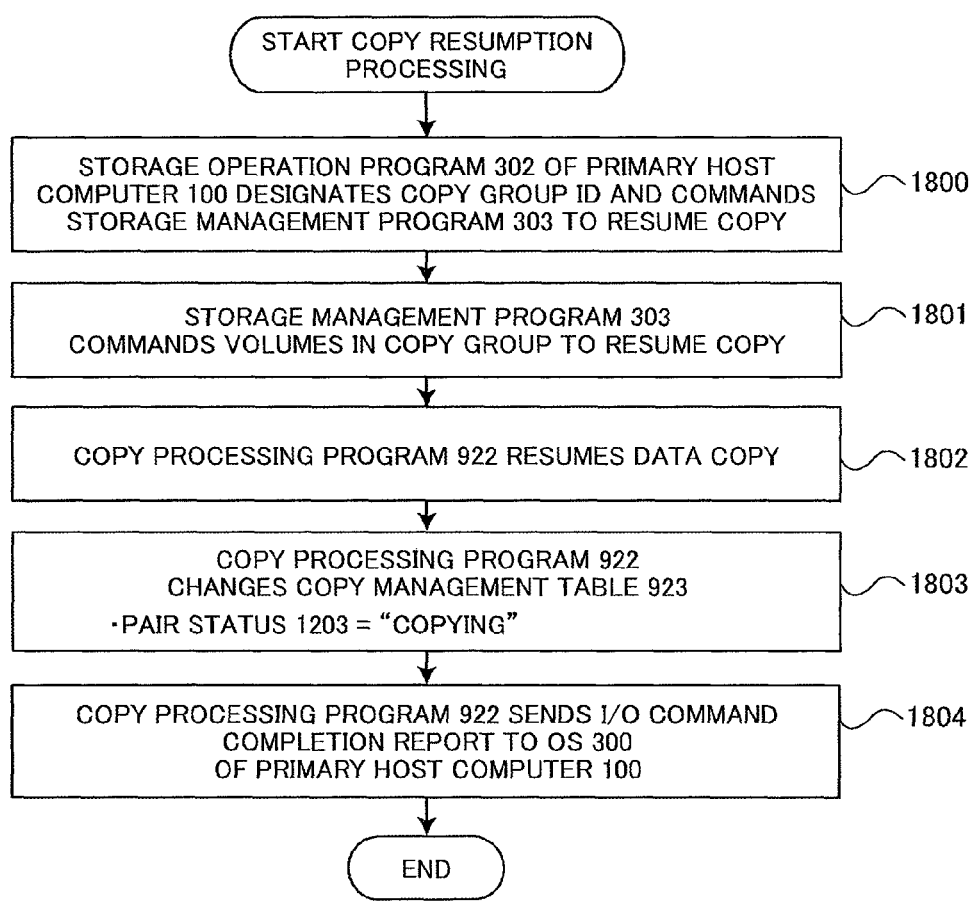
FIG. 18 is a flowchart explaining copy resumption processing in a remote copy system according to an embodiment of the present invention.

FIG. 18 is a flowchart explaining the copy resumption processing in the remote copy system according to the first embodiment of the present invention.

Referring to FIG. 18, foremost, the storage operation program 302 of the primary host computer 110a designates the copy group ID 500, and commands the storage management program 303 to resume copy (1800). Upon receiving this command, the storage management program 303 commands the volumes in the copy group to resume copy (1801).

In response, the copy processing program 922 subsequently resumes the data copy (1802). In conjunction with this, the copy processing program 922 updates the copy management table 923 (1803). Specifically, the copy processing program 922 sets the pair status 1203 of the copy management table 923 to "Copying."

The copy processing program 922 thereafter sends an I/O command completion report to the OS 300 of the primary host computer 110a (1804).

FIG. 19 is a flowchart explaining the copy deletion processing in the remote copy system according to the first embodiment of the present invention.

Referring to FIG. 19, the storage operation program 302 of the primary host computer 110a designates the copy group ID 500, and commands the storage management program 303 to delete copy (1900). Upon receiving this command, the storage management program 303 commands the volumes in the copy group to delete copy (1901).

In response to this, the copy processing program 922 subsequently deletes the data copy (1902). In conjunction with this, the copy processing program 922 updates the copy management table 923 (1903). Specifically, the copy processing program 922 sets the pair status 1204 of the copy management table 923 to "Deleting." In addition, the copy processing program 922 deletes the entries of the copy source volume address 1502 and the primary volume address 1202 in the copy management table 923 that coincide, and deletes the entries of the copy destination volume address 1503 and the secondary volume address 1203 in the copy management table 923 that coincide.

The copy processing program 922 thereafter sends an I/O command completion report to the OS 300 of the primary host computer 110a (1905).

Figure 20A:
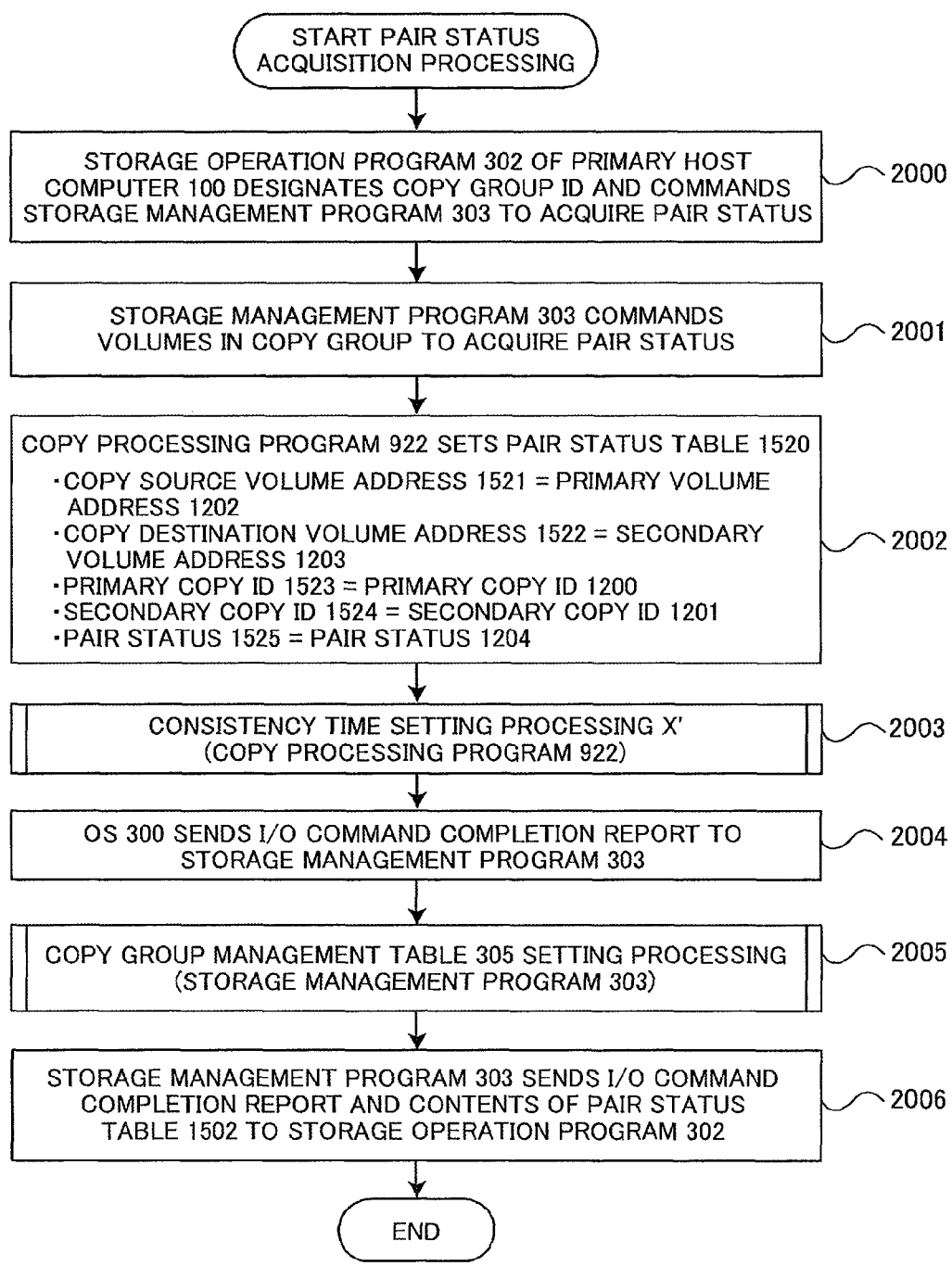
FIG. 20A is a flowchart explaining pair status acquisition processing in a remote copy system according to an embodiment of the present invention.

FIG. 20A is a flowchart explaining the pair status acquisition processing in the remote copy system according to the first embodiment of the present invention.

Referring to FIG. 20A, the storage operation program 302 of the primary host computer 110a designates the copy group ID 500, and commands the storage management program 303 acquires the pair status (2000). Upon receiving this command, the storage management program 303 commands the volumes in the designated copy group 124 to acquire the pair status (2001).

In response, the copy processing program 922 subsequently sets the pair status table 1520 (2002). Specifically, the copy processing program 922 sets the primary volume address 1202 to the copy source volume address 1521 of the pair status table 1520, sets the secondary volume address 1203 to the copy destination volume address 1522, sets the primary copy ID 1200 to the primary copy ID 1523, sets the secondary copy ID 1201 to the secondary copy ID 1524, and sets the pair status 1204 to the pair status 1525. Subsequently, the copy processing program 922 executes the consistency time setting processing X to set the consistency time 1526 (2003).

The OS 300 sends an I/O command completion report to the storage management program 303 (2004). In response, the storage management program 303 calls the copy group management table 305 setting processing (2005). The storage management program 303 thereafter sends an I/O command completion report and the contents of the pair status table 1520 to the storage operation program 302 (2006).

Figure 20B:
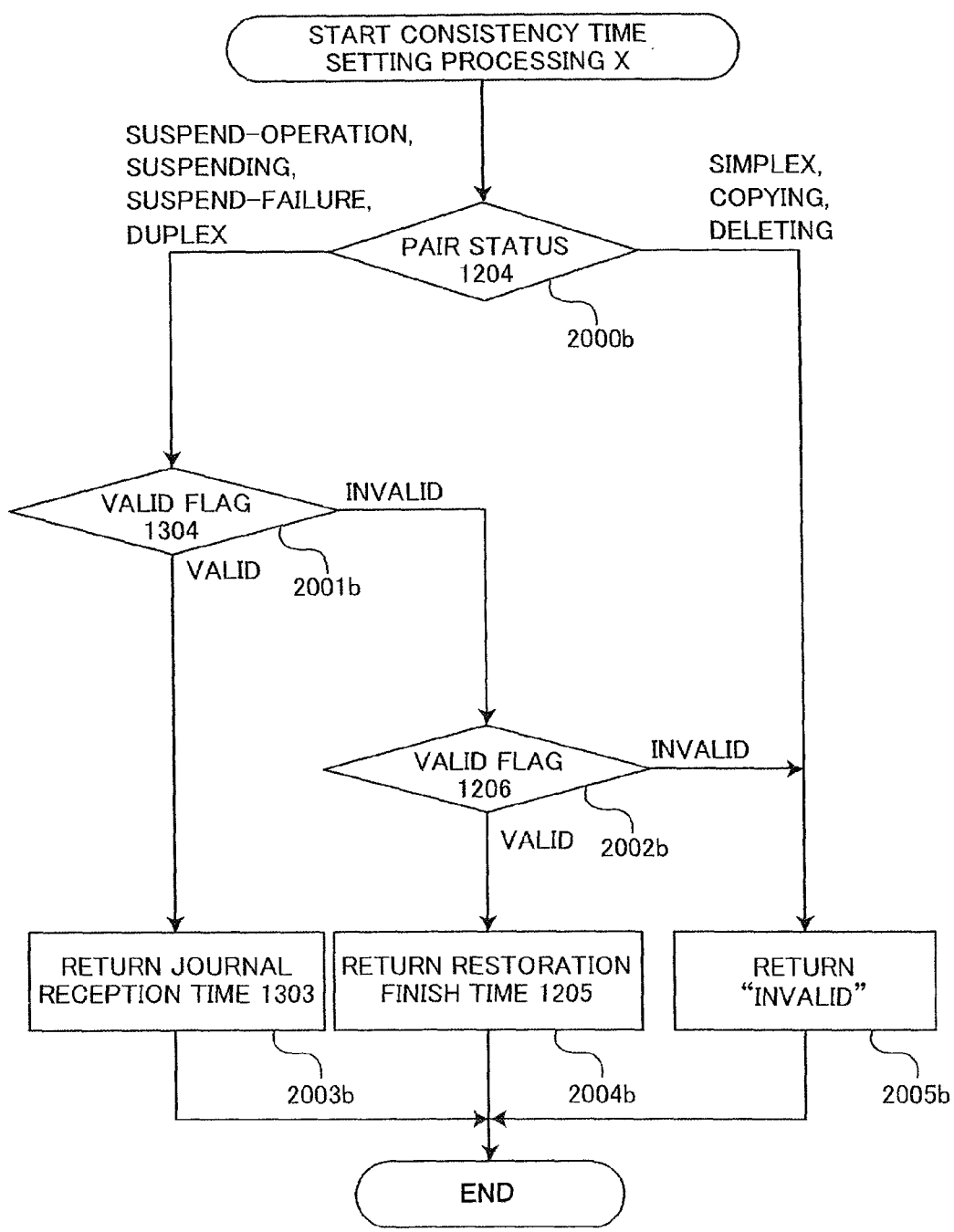
FIG. 20B is a flowchart explaining consistency time setting processing in a remote copy system according to an embodiment of the present invention.

FIG. 20B is a flowchart explaining the consistency time setting processing X in the remote copy system according to the first embodiment of the present invention. The consistency time setting processing X is a part of the processing of the pair status acquisition module 2704 in the copy processing program 922.

In this embodiment, the consistency time setting processing X is used for selecting the recovery point objective (consistency time) according to the status of the storage system.

Referring to FIG. 20B, the copy processing program 922 checks the pair status 1204 (2000b). When the copy processing program 922 determines that the pair status 1204 is one among Suspend-Operation status, Suspending status, Suspend-Failure status, or Duplex status, it additionally checks the valid flag 1304 (2001b).

If the copy processing program 922 determines that the validity flag 1304 is valid, it returns the journal reception time 1303 (2003b). Meanwhile, if the copy processing program 922 determines that the valid flag 1304 is invalid, it additionally checks the valid flag 1206 (2002b). If the copy processing program 922 determines that the valid flag 1206 is valid, it returns the restoration finish I/O command time 1205 (2004b). Meanwhile, if the copy processing program 922 determines that the valid flag 1206 is invalid, the copy processing program 922 returns "invalid" (2005b).

Contrarily, if the pair status is Simplex status, Copying status, or Deleting status as a result of checking the pair status 1204 (2000b), [the copy processing program 922] returns "invalid" (2005b).

Figure 20C:
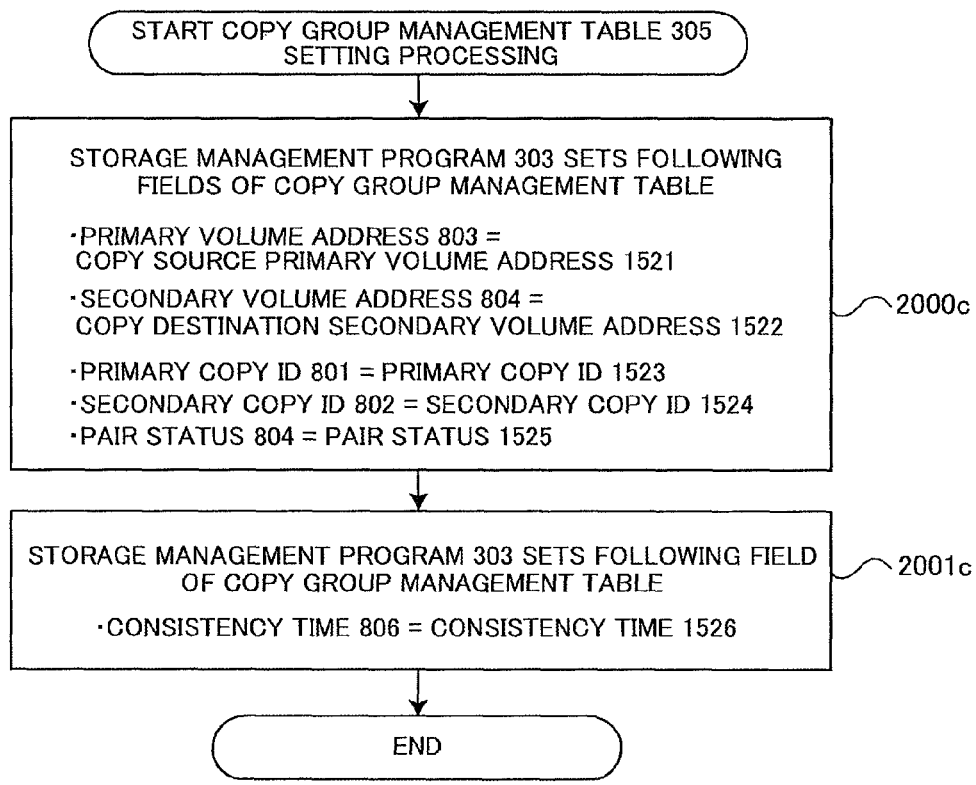
FIG. 20C is a flowchart explaining copy group management table setting processing in a remote copy system according to an embodiment of the present invention.

FIG. 20C is a flowchart explaining the copy group management table 305 setting processing in the remote copy system according to the first embodiment of the present invention.

Referring to FIG. 20C, foremost, the storage management program 303 configures the setting of a prescribed field in the copy group management table 308 (2000c). Specifically, the storage management program 303 sets the copy source volume address 1521 of the pair status table 1520 to the primary volume address 803 of the copy group management table 308. Similarly, the storage management program 303 sets the copy destination volume address 1522 to the secondary volume address 804, sets the primary copy ID 1523 to the primary copy ID 801, sets the secondary copy ID 1524 to the secondary copy ID 802, and sets the pair status 1525 to the pair status 804.

The storage management program 303 subsequently sets the consistency time 1526 of the pair status table 1520 to the consistency time 806 of the copy group management table 308 (2001c).

Figure 21A:
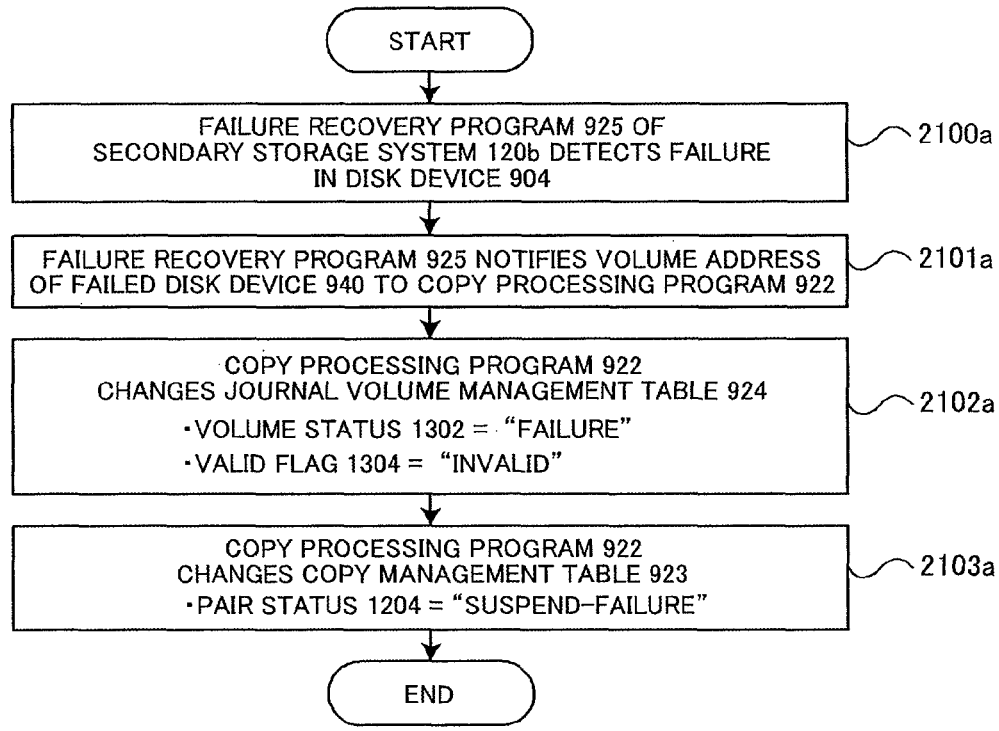
FIG. 21A is a flowchart explaining failure-detected processing in a remote copy system according to an embodiment of the present invention.

FIG. 21A is a flowchart explaining the failure-detected processing in the remote copy system according to the first embodiment of the present invention, and specifically explains the processing to be performed when a hardware failure is detected in the secondary journal volume 122b.

Referring to FIG. 21A, the failure recovery program 925 of the secondary storage system 120b detects a failure of the disk device 940 (2100a). Subsequently, the failure recovery program 925 notifies the volume address of the failed disk device 940 to the copy processing program 922 (2101a).

In response to this, the copy processing program 922 updates the journal volume management table 924 (2102a). Specifically, the copy processing program 922 sets the volume status 1302 of the journal volume management table 924 to "failure," and the validity flag 1304 to "invalid." In addition, the copy processing program 922 sets the pair status 1204 of the copy management table 923 to "Suspend-Failure."

Figure 21B:
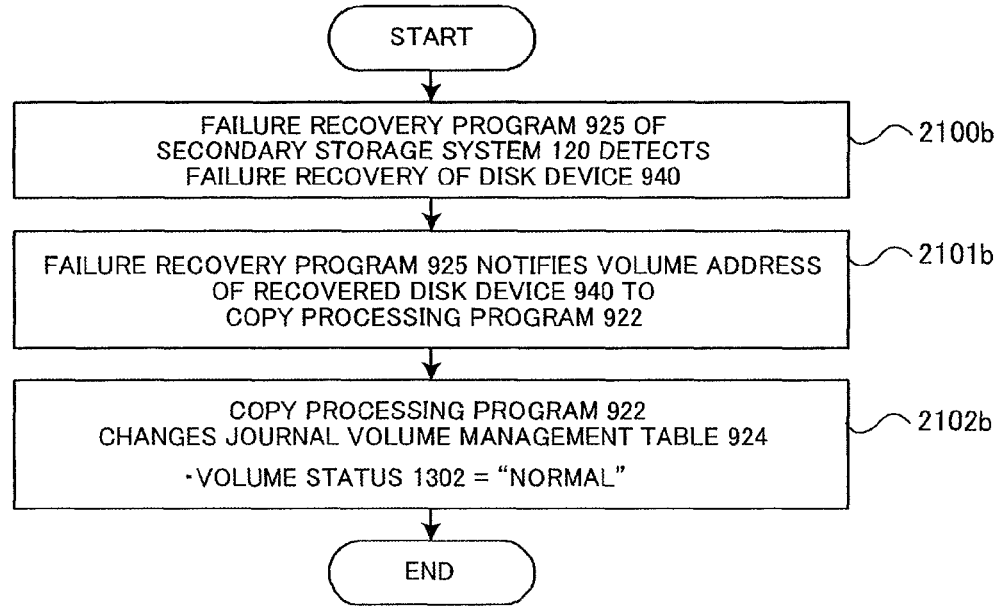
FIG. 21B is a flowchart explaining failure-detected processing in a remote copy system according to an embodiment of the present invention.

FIG. 21B is a flowchart explaining the failure-recovered processing in the remote copy system according to the first embodiment of the present invention, and specifically explains the processing to be performed when the recovery from the hardware failure is detected in the secondary journal volume 122b.

Referring to FIG. 21B, the failure recovery program 925 of the secondary storage subsystem 120b detects the failure recovery of the disk device 940 (2100b). Subsequently, the failure recovery program 925 notifies the volume address of the disk device 940 that recovered from a failure to the copy processing program 922 (2101b).

In response, the copy processing program 922 sets the volume status 1302 of the journal volume management table 924 to "normal" (2102b).

Figure 22:
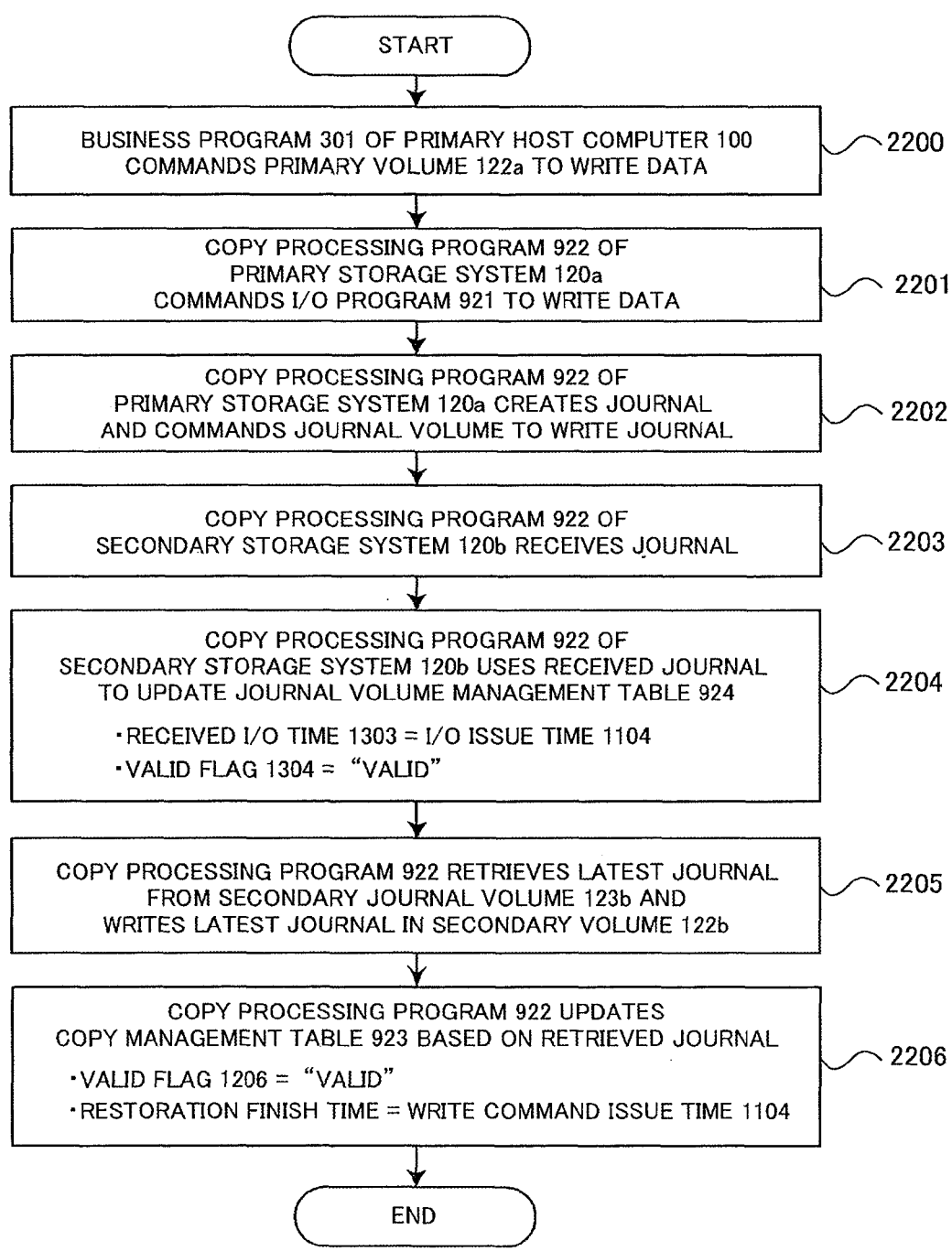
FIG. 22 is a flowchart explaining write processing in a remote copy system according to an embodiment of the present invention.

FIG. 22 is a flowchart explaining the write processing in the remote copy system according to the first embodiment of the present invention. Specifically, FIG. 22 shows the processing to be performed when the primary host computer 110a issues a write command to the primary storage system 120a in order to write data in the primary volume 121a.

Referring to FIG. 22, the business program 301 of the primary host computer 110a sends a data write request to the primary volume 122a under the control of the OS 300 (2200). Upon receiving this request, the copy processing program 922a of the primary storage system 120a commands the I/O program 921 to write data (2201). Subsequently, the copy processing program 922a of the primary storage system 120a creates a journal and commands the primary journal volume 122a to write the data (2202).

The copy processing program 922b of the secondary storage system 120b receives the journal from the primary storage system 120a (2203). The copy processing program 922b of the secondary storage system 102 updates the journal volume management table 924 using the received journal (2204). Specifically, the copy processing program 922b of the secondary storage system 102 sets the write command issue time 1104 to the journal reception time 1303 of the journal volume management table 924, and sets the valid flag 1304 to "valid." Subsequently, the copy processing program 922b sequentially retrieves unprocessed journals from the secondary journal volume 123b and writes them into the secondary volume (2206). The copy processing program 922b updates the copy management table 923 based on the retrieved journals (2206). Specifically, the copy processing program 922b sets the valid flag 1206 of the copy management table 923 to "valid," and the restoration finish command time 1205 to the write command issue time 1104.

EXAMPLES

Calculation examples at the point in time the failure is recovered in the remote copy system of this embodiment are now explained.

FIG. 31A is a diagram showing an example of the copy group definition table 305 of the host computer 100 in the remote copy system according to the first embodiment of the present invention. Further, FIG. 31B shows an example of the journal volume management table 924a of the primary storage system 120a and FIG. 31C shows an example of the journal volume management table 924b of the secondary storage system 120b in the remote copy system according to the first embodiment of the present invention.

In this example, a copy group 124 configured from three copy pairs is defined. Specifically, as shown in FIG. 31A, in the copy group definition table 305 of this example, "GRP01" is set as the copy group ID 500, "01" is set as the primary copy ID 501, and "02" is set as the secondary copy ID 502. In addition, a pair of "P00" and "S00," a pair of "P01" and "S01," and a pair of "P02" and "S02" are respectively set in the primary volume address 503 and the secondary volume address 504.

Moreover, as shown in FIG. 31B, "01" is set as the copy ID 1300 in the journal volume management table 924a of the primary storage system 120a. The copy ID 1300 is configured from two journal volumes "X00" and "X01."

Furthermore, as shown in FIG. 31C, "02" is set as the copy ID 1300 in the journal volume management table 924b of the secondary storage system 120b. Similarly, the copy ID 1300 is configured from two journal volumes "Y00" and "Y01."

FIG. 32 is a diagram showing, in a time series, operations to be performed to the copy group 124 set in the remote copy system according to the first embodiment of the present invention.

Specifically, as shown in FIG. 32, the storage management program 303 of the primary host computer 110a executes the following processing.

Executes the pair status acquisition processing at 10:00.

Executes the pair creation processing at 10:05. Executes the pair status acquisition processing at 10:30.

Intermittently issues write commands to the primary volume at 10:35.

Executes the pair status processing at 12:30.

Copy is suspended due to any one of the following events at 12:40.

*The copy suspension processing is executed with the execution mode as Flush.

*The copy suspension processing is executed with the execution mode as Purge.

*A failure occurs in the primary volume.

*A failure occurs in the secondary journal volume.

Executes the pair status acquisition processing at 12:50.

Executes the pair status acquisition processing at 13:00.

Executes the pair status acquisition processing at 13:30.

Outline of the processing for acquiring the recovery point objective (consistency time) is now explained.

The control flag for selecting the recovery point objective is set when triggered by the performance of pair creation processing, copy suspension processing, copy deletion processing, write processing, or a failure in the secondary journal volume.

Specifically, as described above, the control flags for selecting the recovery point objective are the valid flag 1206 of the copy management table 923 and the valid flag 1304 of the journal volume management table 924. The validity flags 1206 and 1304 are set according to the flowcharts shown in FIG. 16 to FIG. 19, FIG. 21, and FIG. 22.

More specifically, the trigger for setting the validity flag 1304 of the journal volume management table 924 to "valid" is when data is written into the primary volume 122a, the secondary storage system 120b receives a journal from the primary storage system 120a, and such journal is stored in the secondary journal volume 123b.

The trigger for setting the valid flag 1204 of the copy management table 923 to "valid" is when the journal stored in the secondary journal volume 123b is reflected in the secondary volume 122b.

The trigger for setting the validity flag 1306 of the journal volume management table 924 and the validity flag 1204 of the copy management table 923 to "invalid" is as follows.

First, if the pair creation processing is executed, entries of the copy management table 923 regarding that copy pair are created, and "invalid" is set to the valid flag 1204 and "invalid" is set to the valid flag 1306, respectively.

Second, if the copy suspension processing is executed by designating "Purge" as the execution mode, "invalid" is set to the valid flag 1306.

And third, if a failure occurs in the secondary journal volume 122b, "invalid" is set to the valid flag 1306.

Additionally, even if the failed secondary journal volume 122b recovers from its failure, "invalid" is not set to the valid flag 1306.

If the pair deletion processing is executed, since the pair status will be a Simplex status, entries of the copy management table 923 of that copy pair are deleted.

If the copy processing is resumed and executed, these control flags are not changed.

The copy processing program 922 of this embodiment sets the control flags and sets the recovery point objective (consistency time) triggered by the execution of the pair status acquisition processing asynchronously with the setting of the foregoing control flags.

The method of seeking the recovery point objective when the pair status acquisition processing is executed at 10:00, 10:30, 12:30, 12:50, and 13:30 as shown in FIG. 32 is now explained.

FIGS. 33A-33D are diagrams respectively showing the contents of the respective tables when the pair status acquisition processing is executed at a certain time in the remote copy system according to the first embodiment of the present invention. Specifically, FIG. 33A is a diagram showing the contents of the copy management table 923 at the time the pair status acquisition processing is executed at 10:00 in the remote copy system according to the first embodiment of the present invention. FIG. 33B is a diagram showing the contents of the journal volume management table 924a of the primary storage system 120a and FIG. 33C is a diagram showing the contents of the journal volume management table 924b of the secondary storage system 120b at the time the pair status acquisition processing is executed at 10:00 in the remote copy system according to the first embodiment of the present invention. FIG. 33D is a diagram showing the contents of the pair status table 1520 at the time the pair status acquisition processing is executed at 10:00 in the remote copy system according to the first embodiment of the present invention.

Specifically, as of 10:00, the journal volume management table 924a shown in FIG. 33B and the journal volume management table 924b shown in FIG. 33C are the same as the tables shown in FIG. 31B and FIG. 31C. In addition, as of 10:00, since it is the Simplex status as shown in FIG. 33D, the consistency time 1525 is NULL and, therefore, the recovery point objective does not exist.

FIGS. 34A-34D are diagrams respectively showing the contents of the respective tables when the pair status acquisition processing is executed at a certain time in the remote copy system according to the first embodiment of the present invention. Specifically, FIGS. 34A-34D are diagrams respectively showing the contents of the copy management table 923, the journal volume management table 924a, the journal volume management table 924b, and the pair status table 1520 at the time the pair status acquisition processing is executed at 10:00 in the remote copy system according to the first embodiment of the present invention.

As of 10:30, since the creation/copy processing has already been executed, the pair status 1204 has changed to the Duplex status pursuant to the completion of the creation/copy. If the creation/copy is incomplete, the pair status will be a Copying status.

The recovery point objective at this point in time is sought as follows.

Specifically, the copy processing program 922 calls the consistency time setting processing X, and determines whether the validity flag 1304b of the journal volume management table 924b shown in FIG. 34C is "valid." In this example, since the validity flag 1304b is "invalid," the copy processing program 922 determines whether the validity flag 1206 of the copy management table 923 shown in FIG. 34A is "valid."

In this example, since the validity flag 1206 is "invalid," the copy processing program 922 does not set a recovery point objective to the consistency time 1526 of the pair status table 1520 shown in FIG. 34D. Thus, the consistency time 1526 is NULL.

FIGS. 35A-35D are diagrams respectively showing the contents of the respective tables when the pair status acquisition processing is executed at a certain time in the remote copy system according to the first embodiment of the present invention. Specifically, FIGS. 35A-35D are diagrams respectively showing the contents of the copy management table 923, the journal volume management table 924a, the journal volume management table 924b, and the pair status table 1520 at the time the pair status acquisition processing is executed at 12:30 in the remote copy system according to the first embodiment of the present invention.

As of 12:30, data is being written into the primary volume 122a with the pair status being a Duplex status. Thus, a journal is created in the primary storage system 120a based on the writing of data into the primary volume 122a, the created journal is transferred to the secondary storage system 120b, and the journal that arrived at the secondary storage system 120b is reflected in the secondary volume 122b. The latest time among the time attached to the journals received by the secondary storage system 120b for each journal volume 123b is set in the journal reception time 1303b of the journal volume management table 924b in the secondary storage system 120b shown in FIG. 35B.

The recovery point objective at this point in time is sought as follows.

Specifically, the copy processing program 922 determines whether the validity flag 1304b of the journal volume management table 924b shown in FIG. 35C is "valid." In this example, since the validity flag 1304b is "valid," the copy processing program 922 sets the journal reception time 1303b (i.e., "12:24") of the journal volume management table 924b shown in FIG. 35B as the recovery point objective in the consistency time 1526 of the pair status table 1520.

As described above and shown in FIG. 32, as factors for the copy of the primary site to the secondary site being suspended at 12:40, described were the four methods of when the copy suspension processing is performed in the execution mode of "Flush," when the copy suspension processing is performed in the execution mode of "Purge," when a failure occurs in the primary volume 122a, and when a failure occurs in the secondary journal volume 123b. The processing in each of the foregoing cases is now explained with reference to FIG. 36 to FIG. 39.

FIGS. 36A-36D are diagrams respectively showing the contents of the respective tables when the pair status acquisition processing is executed at a certain time in the remote copy system according to the first embodiment of the present invention. Specifically, FIGS. 36A-36D are diagram respectively showing the contents of the copy management table 923, the journal volume management table 924a, the journal volume management table 924b, and the pair status table 1520 when the copy suspension processing in the execution mode of "Flush" is executed at 12:40 and the pair status acquisition processing is executed at 12:50 in the remote copy system according to the first embodiment of the present invention.

When the copy processing program 922 executes the copy suspension processing in the execution mode of "Flush," it reflects the update journal) of the primary volume 122a up to the point in time that the copy suspension processing was executed in the secondary volume 122b, and thereafter changes the pair status to a Suspend-Operation status. The pair status immediately after the copy suspension processing is a Suspending status.

Since the journals up to the point in time that the copy suspension processing was executed are read by the secondary storage system 120b and written into the secondary volume 122b, the restoration finish time 1205 of the copy management table 923a shown in FIG. 36A will be the same as the time that the copy suspension processing was executed; namely, "12:40." The journal reception time 1303b of the journal volume management table 924b of the secondary storage system 120b will also be the same as the time that the copy suspension processing was executed; namely, "12:40."

The recovery point objective at this point in time is sought as follows.

Specifically, the copy processing program 922 determines whether the valid flag 1304b of the journal volume management table 924b shown in FIG. 36C is "valid." In this example, since the validity flag 1304b is "valid," the copy processing program 922 sets the journal reception time 1303b (i.e., "12:40") of the journal volume management table 924b shown in FIG. 36B as the recovery point objective in the consistency time 1526 of the pair status table 1520 shown in FIG. 14D.

FIG. 37A to FIG. 37D are diagrams respectively showing the contents of the respective tables when the pair status acquisition processing is executed at a certain time in the remote copy system according to the first embodiment of the present invention. Specifically, FIG. 37A to FIG. 37D are diagrams respectively showing the contents of the copy management table 923, the journal volume management table 924a, the journal volume management table 924b, and the pair status table 1520 when the copy suspension processing in the executed mode of "Purge" is executed at 12:40 and the pair status acquisition processing is executed at 12:50 in the remote copy system according to the first embodiment of the present invention.

When the copy processing program 922 executes the copy suspension processing in the execution mode of "Purge," it discards the journals remaining in the journal volume 122, and changes the pair status to a Suspend-Operation status.

Thus, the restoration finish time 1205 of the copy management table 923 shown in FIG. 14A is earlier than the time ("12:34" in this example) that the copy suspension processing was executed. Since the journals have been discarded, the validity flag 1304b of the journal volume management table 924b in the secondary storage system 120b is "invalid" and, therefore, the journal reception time 1303b is also "invalid."

The recovery point objective at this point in time is sought as follows.

Specifically, the copy processing program 922 determines whether the validity flag 1304b of the journal volume management table 924b shown in FIG. 37C is "valid." In this example, since the valid flag 1304b is "invalid," the copy processing program 922 subsequently determines whether the valid flag 1206 of the copy management table 923 shown in FIG. 14A is "valid."

Here, since the validity flag 1206 is "valid," the copy processing program 922 sets the restoration finish time 1205 (i.e., "12:33") of the copy management table 923 shown in FIG. 14A as the recovery point objective in the consistency time 1526 of the pair status table 1520 shown in FIG. 14D.

FIGS. 38A-38D are diagrams respectively showing the contents of the respective tables when a failure occurs in the primary volume at a certain time in the remote copy system according to the first embodiment of the present invention. Specifically, FIGS. 38A-38D are diagrams respectively showing the contents of the copy management table 923, the journal volume management table 924a, the journal volume management table 924b, and the pair status table 1520 when a failure occurs in the primary volume 122a at 12:40 in the remote copy system according to the first embodiment of the present invention.

When the primary volume 122a is subject to a failure, the pair status 1204 of the copy management table 923 is changed to a "Suspend-Failure" status.

Here, since the journal volume 122b of the secondary storage system 120b is not subject to a failure, the journals transferred to the secondary journal volume 122b are reflected in the secondary volume 122b even if a failure occurs in the primary volume.

The recovery point objective at this point in time is sought as follows.

Specifically, the copy processing program 922 determines whether the valid flag 1304b of the journal volume management table 924b shown in FIG. 38C is "valid." In this example, since the validity flag 1304b is "valid," the copy processing program 922 sets the journal reception time 1303 (i.e., "12:38") of the journal volume management table 924b shown in FIG. 14C as the recovery point objective in the consistency time 1526 of the pair status table 1520 shown in FIG. 14D.

FIGS. 39A-39D are diagrams respectively showing the contents of the respective tables when a failure occurs in the secondary volume 122b at a certain time in the remote copy system according to the first embodiment of the present invention. Specifically, FIGS. 39A-39D are diagrams respectively showing the contents of the copy management table 923, the journal volume management table 924a, the journal volume management table 924b, and the pair status table 1520 when a failure occurs in the secondary volume 122b at 12:40 in the remote copy system according to the first embodiment of the present invention.

Since a failure occurred in the secondary journal volume, the pair status is a Suspend-Failure status. The journals are reflected in the secondary volume 122b until just before the failure occurs in the secondary journal volume 120b.

The recovery point objective at this point in time is sought as follows.

Specifically, the copy processing program 922 determines whether the validity flag 1304b of the journal volume management table 924b shown in FIG. 39C is "valid." In this example, since the valid flag 1304b is "invalid," the copy processing program 922 subsequently determines whether the validity flag 1206 of the copy management table 923 shown in FIG. 14A is "valid."

Consequently, since the validity flag 1206 is "valid," the copy processing program 922 sets the restoration finish time 1205 (i.e., "12:33") of the copy management table 3602d shown in FIG. 14A as the recovery point objective in the consistency time 1526 of the pair status table 1520 shown in FIG. 14D.

FIGS. 40A-40D are diagrams respectively showing the contents of the respective tables when the pair status acquisition processing is executed at a certain time in the remote copy system according to the first embodiment of the present invention. Specifically, FIGS. 40A-40D are diagrams respectively showing the contents of the copy management table 923, the journal volume management table 924a, the journal volume management table 924b, and the pair status table 1520 at the time the pair deletion processing is executed at 13:00 and the pair status acquisition processing is executed at 13:30 in the remote copy system according to the first embodiment of the present invention.

Here, since the pairs as of 13:00 are deleted and the pair status is a Simplex status, the recovery point objective does not exist at this point in time.

As described above, according to the present embodiment, the copy processing program 922 of the storage system 120 receives a command from the host computer 110, and sets either the time attached to the latest journal received by the secondary storage system 120b or the time attached to the journal that was last reflected in the secondary volume as the valid recovery point objective. The storage operation program 302 presents the recovery point objective to the user and, therefore, the user is able to easily comprehend a valid recovery point objective without having to give consideration to the occurrence of failures.

Second Embodiment

The second embodiment describes a case where the storage management program 303 acquires the status of the secondary storage system 120b, and presents, according to the acquired status, either the time attached to the latest journal received by the secondary storage system 120b or the time attached to the journal reflected in the secondary volume 122b as the recovery point objective. The main points that differ from the first embodiment are explained below.

FIG. 23 shows an example of the pair status table 1520 in the remote copy system according to the second embodiment of the present invention.

As shown in FIG. 23, the pair status table 1520 of this embodiment includes, in substitute for the consistency time 1526, a first consistency time 1527, a first validity flag 1528, a second consistency time 1529, and a second validity flag 1530.

When the storage system 120 receives a pair status acquisition command, the restoration finish time 1205 of the copy management table 923 is set as the recovery point objective in the first consistency time 1527.

When the storage system 120 receives a pair status acquisition processing, the journal reception time 1303 of the journal volume management table 924 is set as the recovery point objective in the second consistency time 1529.

The value of the validity flag 1206 in the copy management table 923 and the value of the validity flag 1304 in the journal volume management table 924 are respectively set in the first validity flag 1528 and the second validity flag 1530.

Figure 24:
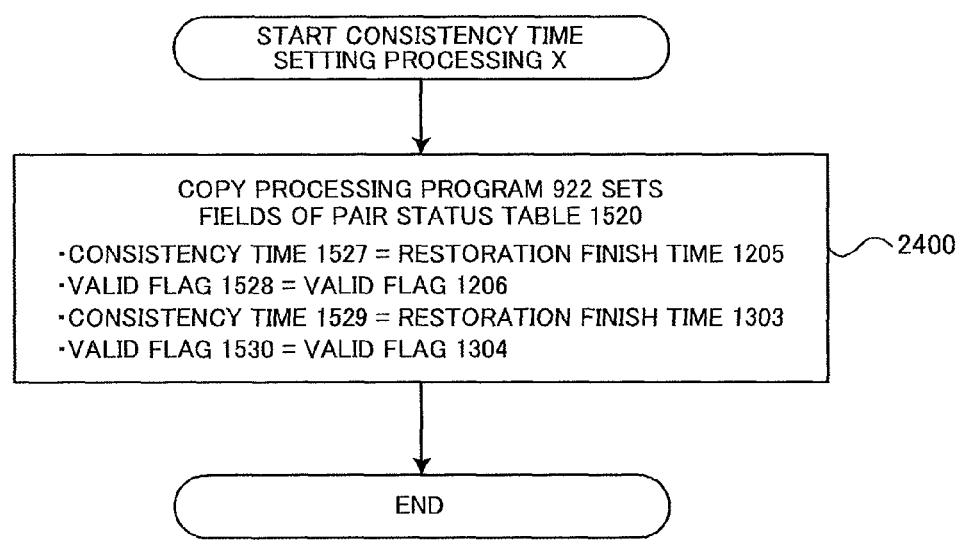
FIG. 24 is a flowchart explaining consistency time setting processing in a remote copy system according to an embodiment of the present invention.

FIG. 24 is a flowchart explaining the consistency time setting processing X' in the remote copy system according to the second embodiment of the present invention.

As shown in FIG. 24, the copy processing program 922 executes the consistency time setting processing X', and sets prescribed values in the respective fields of the pair status table 1520 (2400). Specifically, the copy processing program 922 sets the restoration finish time 1205 of the copy management table 923 to the first consistency time 1527 of the pair status table 1520, and sets the validity flag 1206 to the first validity flag 1528. In addition, the copy processing program 922 sets the journal reception time 1303 of the journal volume management table 924 to the second consistency time 1529 of the pair status table 1520, and sets the validity flag 1304 to the second validity flag time 1530.

Although the storage system 120 determined the valid recovery point objective in the foregoing first embodiment, in this embodiment, the host computer 110 makes such determination. Specifically, in the first embodiment, the copy processing program 922 of the storage system 120 that received a pair status acquisition command from the storage management program 303 based on the instructions of the storage operation program 302 of the host computer 110 uses the validity flag 1304 and the validity flag 1206 to determine a valid recovery point objective, returns the pair status table 2005 set with the recovery point objective to the storage management program 303, and the storage management program 303 reports this as is to the storage operation program 302. In contrast, in this embodiment, the copy processing program 922 of the storage system 110 sends the information (contents of the copy management table 923 and the journal volume management table 924) that it is retaining in accordance with the command from the storage management program 303 of the host computer 110 to the storage management program 303. The storage management program 303 determines a valid recovery point objective based on the command reply from the storage system 120.

Figure 25:
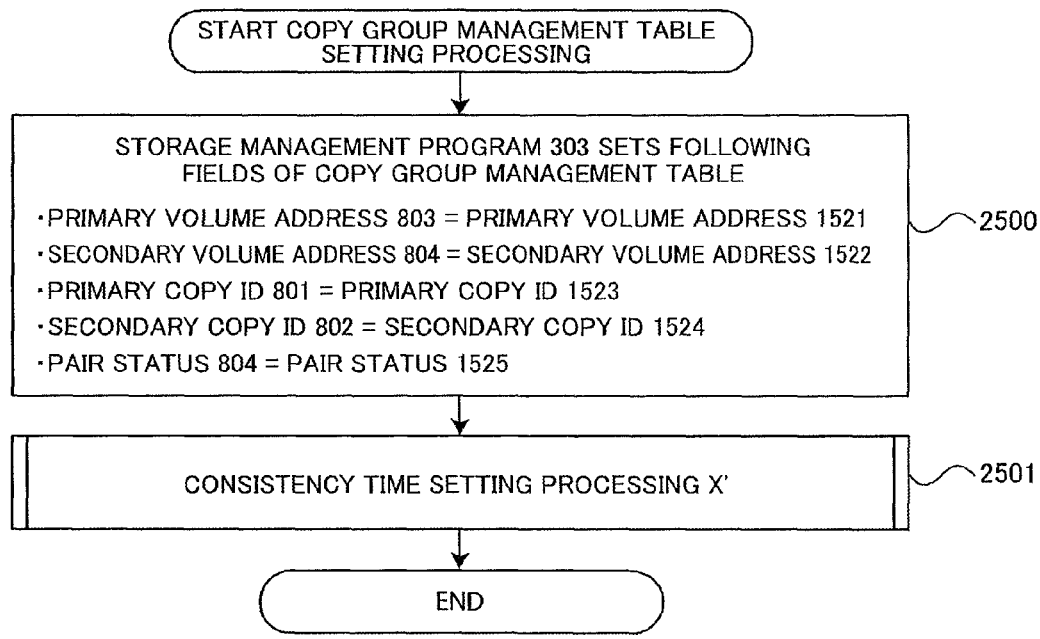
FIG. 25 is a flowchart explaining copy group management table setting processing in a remote copy system according to an embodiment of the present invention.

FIG. 25 is a flowchart explaining the copy group management table setting processing in the remote copy system according to the second embodiment of the present invention.

Referring to FIG. 25, the storage management program 303 configures settings in a prescribed field of the copy group management table 308 (2500). This is the same as step 2000c of FIG. 20C. Subsequently, the storage management program 303 performs the consistency time setting processing X' and acquires the consistency time (2002).

Figure 26:
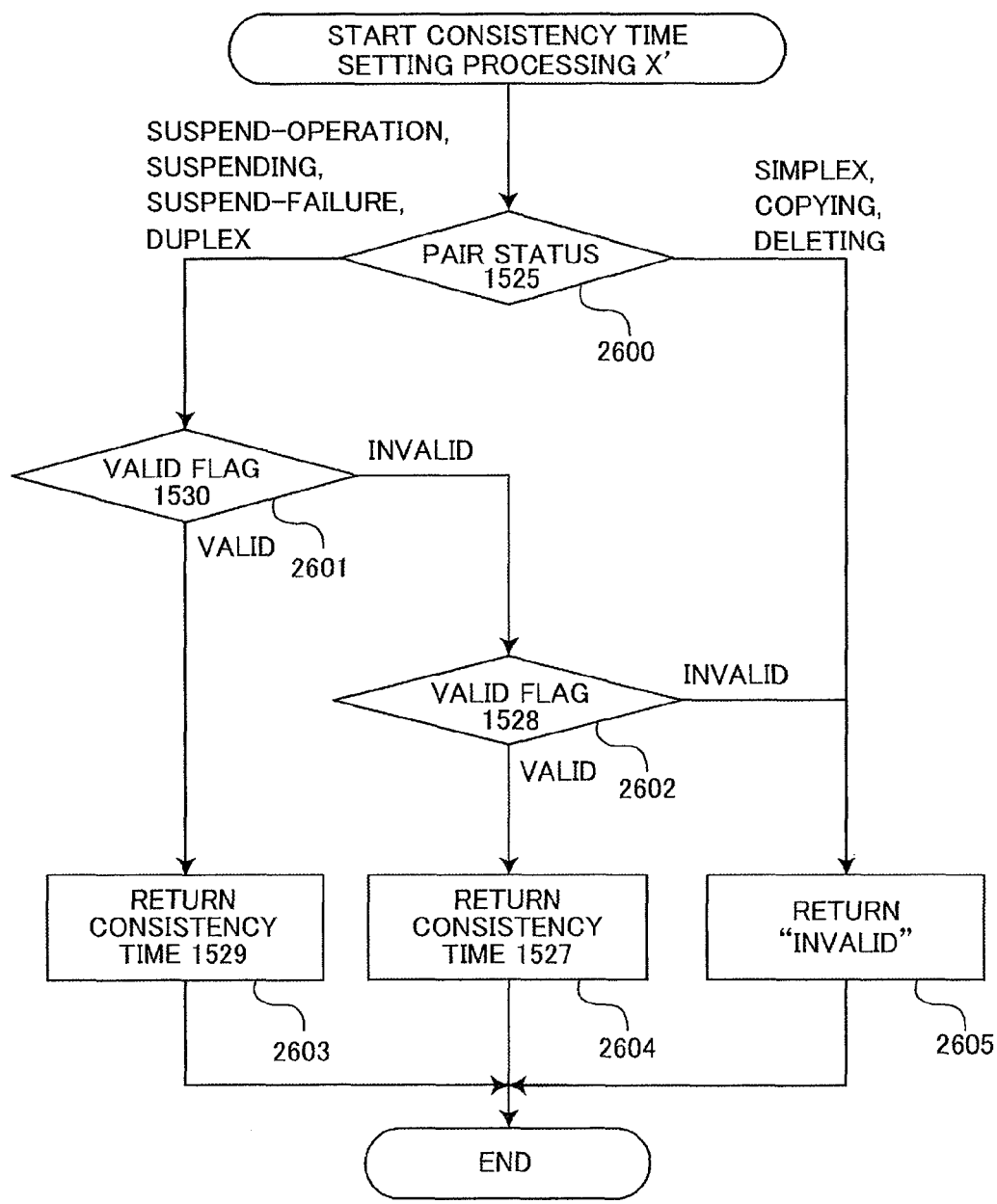
FIG. 26 is a flowchart explaining consistency time setting processing in a remote copy system according to an embodiment of the present invention.

FIG. 26 is a flowchart explaining the consistency time setting processing X' in the remote copy system according to the second embodiment according to the present invention.

Referring to FIG. 26, foremost, the storage management program 303 checks the pair status 1525 of the pair status table 1520 (2600). If the storage management program 303 determines that the pair status 1525 is a Suspend-Operation status, a Suspending status, a Suspend-Failure status, or a Duplex status, it additionally checks the second valid flag 1530 (2601).

If the storage management program 303 determines that the second validity flag 1530 is "valid," it returns the second consistency time 1529 (2603). Meanwhile, if the storage management program 303 determines that the validity flag 1304 is "invalid," it additionally checks the first validity flag 1528 (2602). If the storage management program 303 determines that the validity flag 1206 is "valid," it returns the first consistency time 1527 (2604). Meanwhile, if the storage management program 303 determines that the valid flag 1206 is invalid, it returns "invalid" (2605).

Contrarily, if the pair status is Simplex status, Copying status, or Deleting status as a result of checking the pair status 1525 (2600), the storage management program 303 returns "invalid" (2605).

In this embodiment, the storage management program 303 seeks the recovery point objective (consistency time) based on the pair status table 1520. The first consistency time 1527 and the first valid flag 1528 of the pair status table 1520' respectively correspond to the journal reception time 1303 and the valid flag 1304 of the journal volume management table 924, and the second consistency time 1529 and the second valid flag 1530 of the pair status table 1520' respectively correspond to the restoration finish time 1205 and the valid flag 1206 of the copy management table 923. Thus, the calculation examples of the recovery point objective in this embodiment can be similarly explained by reading the journal reception time 1303, the valid flag 1304, the restoration finish time 1205, and the valid flag 1206 of the first embodiment as the corresponding items in the second embodiment.

As described above, according to the present embodiment, the storage management program 303 of the host computer 110 sets, based on the instructions of the storage operation program 302, either the time attached to the latest journal received by the secondary storage system 120b or the time attached to the journal that was last reflected in the secondary volume as the valid recovery point objective according to the information acquired from the storage system 120. The storage operation program 302 presents the set recovery point objective to the user and, therefore, the user is able to easily comprehend a valid recovery point objective without having to give consideration to the occurrence of failures.

Other Embodiments

Each of the foregoing embodiments is merely an exemplification for explaining the present invention, and is not intended to limit this invention to such embodiments. The present invention may be worked in various modes so as long as the working does not deviate from the gist hereof. For example, although the foregoing embodiments sequentially explained the processing of the various programs, the present invention is not limited thereto. Thus, the configuration may also be such that the processing sequence is switched or the processing is performed in parallel so as long as there is no contradiction in the processing result.

The present invention can be broadly applied to a remote copy system configured from computer systems installed respectively at a primary site and a secondary site.

What is claimed is:

1. A remote copy system, comprising:
a first host computer;
a first storage system operatively connected to the first host computer and including a first volume;
a second host computer; and
a second storage system operatively connected to the second host computer and the first storage system, and including a second volume forming a pair relationship with the first volume,
wherein, when the first storage system receives one of write commands from the first host computer, the first storage system stores data accompanied with the write command in the first volume, and creates a journal data to which a time information is added based on a time stamp included with said one of the write commands,
wherein the second storage system receives the created journal data from the first storage system, and updates the second volume based on the received journal data,
wherein the first host computer acquires a valid recovery point objective, depending on an operating status of the second storage system pertaining to either the latest time information among time information of each journal data that the second storage system received or the latest time information among time information of each journal data that updates the second volume,
wherein the first storage system includes:
a first copy management table that manages the pair relationship;
a first journal volume configured to temporarily store the created journal data; and
a first journal volume management table that manages the first journal volume, and
wherein the second storage system includes:
a second copy management table that manages the pair relationship;
a second journal volume configured to temporarily store the received journal data; and
a second journal volume management table that manages the second journal volume,
wherein the second copy management table retains a pair status indicating a status of the pair relationship, a restore finish time indicating the time information added to the latest information among time information of each journal data that updated the second volume, and a first validity flag indicating validity of the restore finish time; and
wherein the second journal volume management table retains a journal reception time indicating the time information added to the latest time information among time information of each journal data that the second storage system received, and a second validity flag indicating validity of the journal reception time.

2. The remote copy system according to claim 1, wherein, in response to a pair status acquisition command sent from the first host computer, the first storage system refers to the second copy management table and the second journal volume management table, sets the valid recovery point objective, and sends the valid recovery point objective to the first host computer.

3. The remote copy system according to claim 1, wherein the first host computer provides the acquired valid recovery point objective to a user.

4. A computer system, comprising:
a first computer system including a host computer, a first storage volume that stores I/O data from/to host computer, and a first journal volume that stores journal data created based on the I/O data, wherein time information is added to the journal data based on a time stamp included with one of write commands from the host computer to store said journal data; and
a second computer system including a second journal volume that stores the journal data sent from the first computer system via a communication line, and a second storage volume that stores the journal data based on time information pertaining to the journal data;

wherein the computer system further comprises:
a management unit configured to manage an operating status of the second computer system;
a determination unit configured to determine a valid recovery point objective, based on the operating status of the second computer system, pertaining to either the latest time information among the time information of each journal data received in the second journal volume or the latest time information among time information of each journal data that updates the second volume,
wherein the first computer system includes:
a first copy management table that manages the pair relationship;
a first journal volume configured to temporarily store the created journal data; and
a first journal volume management table that manages the first journal volume, and
wherein the second computer system includes:
a second copy management table that manages the pair relationship;
a second journal volume configured to temporarily store the received journal data; and
a second journal volume management table that manages the second journal volume,
wherein the second copy management table retains a pair status indicating a status of the pair relationship, a restore finish time indicating the time information added to the latest time information among time information of each journal data that updated the second volume, and a first validity flag the restore finish time; and
wherein the second journal volume management table retains a journal reception time indicating the time information added to the latest time information among time information of each journal data that the second storage system received, and a second validity flag indicating validity of the journal reception time.

5. The computer system according to claim 4, wherein the management unit manages the copy pair status of the second computer system.

* * * * *